US007152080B2

(12) United States Patent
Mikami

(10) Patent No.: US 7,152,080 B2
(45) Date of Patent: Dec. 19, 2006

(54) METHOD, APPARATUS, AND COMPUTER READABLE MEDIUM FOR MANAGING REPLICATION OF BACK-UP OBJECT

(75) Inventor: Shougo Mikami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 427 days.

(21) Appl. No.: 10/743,727

(22) Filed: Dec. 24, 2003

(65) Prior Publication Data
US 2005/0076070 A1 Apr. 7, 2005

(30) Foreign Application Priority Data
Oct. 2, 2003 (JP) ............................... 2003-343916

(51) Int. Cl.
G06F 12/00 (2006.01)
G06F 17/30 (2006.01)
G06F 7/00 (2006.01)
(52) U.S. Cl. ........................................ 707/204; 707/10
(58) Field of Classification Search ................ 707/204, 707/10
See application file for complete search history.

(56) References Cited

U.S. PATENT DOCUMENTS

| 3,834,324 | A | 9/1974 | Lang |
| 5,845,318 | A | 12/1998 | Rose et al. |
| 6,131,148 | A | 10/2000 | West et al. |
| 6,173,377 | B1 | 1/2001 | Yanai et al. |
| 6,260,120 | B1 * | 7/2001 | Blumenau et al. ........... 711/152 |
| 6,304,948 | B1 | 10/2001 | Motoyama et al. |
| 6,845,434 | B1 | 1/2005 | Lin |
| 6,851,015 | B1 | 2/2005 | Akahane et al. |
| 2002/0103980 | A1 | 8/2002 | Crockett et al. |
| 2003/0196036 | A1 | 10/2003 | Gibble et al. |
| 2003/0217119 | A1 * | 11/2003 | Raman et al. ............... 709/219 |
| 2004/0059882 | A1 | 3/2004 | Kedem et al. |

FOREIGN PATENT DOCUMENTS

JP A-2001-318833 11/2001

OTHER PUBLICATIONS

VERITAS Volume Manager™ 3.2, Adminstrator's Guide, Solaris, Aug. 2001.*
VERITAS NetBackup™ DataCenter 4.5, System Administrator's Guide for UNIX, Mar. 2002.*

* cited by examiner

*Primary Examiner*—John Cottingham
*Assistant Examiner*—Kuen S. Lu
(74) *Attorney, Agent, or Firm*—Mattingly, Stanger, Malur & Brundidge, P.C.

(57) ABSTRACT

Replication data acquired by a copy and a volume storing therein this replication data are flexibly managed in response to the needs of a user depending on the attributes of a file which becomes the target of the copy executed by a storage apparatus. More concretely, when receiving an instruction of the backup for a file to be the backup target, if there has been received a specification about the attributes of the backup target, or a method of managing replication data acquired by the backup of this backup target, the specified attributes and the like are managed in a manner of being made to correspond to the replication data and a volume name into which this replication data should be stored.

9 Claims, 12 Drawing Sheets

FIG. 3

| GROUP 300 | BACKUP TARGET 301 | SERVER 302 | EXPIRATION TIME-LIMIT 303 | POLICY | | |
|---|---|---|---|---|---|---|
| | | | | "NEWEST STATE ONLY" 305 | "SECONDARY UTILIZATION" 304 | "DISASTER RECOVERY" 306/307 |
| A | System | A | — | FLAG IS PRESENT | — | — |
| B | Temp | A | 2 weeks | FLAG IS PRESENT | FLAG IS PRESENT | — |
| C | System,ccc.txt | A | — | — | FLAG IS PRESENT | — |
| D | Temp,ddd.txt | A,B | 1 year | FLAG IS PRESENT | — | FLAG IS PRESENT |
| E | System,eee.txt | B | — | — | — | FLAG IS PRESENT |
| ... | ... | ... | ... | ... | ... | ... |
| Q | qqq.txt | C | — | FLAG IS PRESENT | — | — |

FIG. 4

| DATABASE NAME (400) | FILE NAME (401) | DEVICE FILE NAME (402) | DISK ID (403) | HOUSING ID (404) |
|---|---|---|---|---|
| system | aaa.txt | c5t0d1 | 001 | 100 |
| system | bbb.txt | c5t0d2 | 003 | 100 |
| temp | ccc.txt | c5t0d3 | 003 | 100 |
| : | : | : | : | : |
| — | qqq.txt | c6t1d3 | 002 | 200 |
| : | : | : | : | : |

FIG. 5

| BUSINESS-OPERATION NAME (500) | NECESSARY DATA (501) |
|---|---|
| A | — |
| B | (A,aaa.txt) |
| C | (A,aaa.txt),(B,bbb.txt) |
| D | (A,aaa.txt),(C,temp) |
| E | (A,aaa.txt),(B,bbb.txt),(C,ddd.txt) |

FIG. 6

| DISK ID | HOUSING ID | USE SERVER | TYPE | PAIR-DISK ID | PAIR-HOUSING ID | AVAILABLE FLAG | REPLICATION DATA GROUP | BACKUP TARGET | GENERATION NUMBER | FAULT FLAG |
|---|---|---|---|---|---|---|---|---|---|---|
| 001 | 100 | A | ORIGINAL | 003 | 100 | — | — | — | — | |
| 002 | 100 | B | DUPLICATE | | | — | A | aaa.txt | 1 | ABSENT |
| 003 | 100 | A | DUPLICATE | 001 | 100 | — | C | aaa.txt | 2 | ABSENT |
| 005 | 200 | C | DUPLICATE | 002 | 200 | — | F | Fff.txt | 3 | PRESENT |

FIG. 13

| GROUP | BACKUP TARGET | REPLICATION DATA | | | | |
|---|---|---|---|---|---|---|
| | | 1 | 2 | 3 | 4 | 5 |
| A | System | ■ | ■ | ■ | □ | □ |
| B | Temp | □ | □ | | | |
| C | System | □ | □ | □ | | |
| | ccc.txt | ■ | □ | | | |

METHOD, APPARATUS, AND COMPUTER READABLE MEDIUM FOR MANAGING REPLICATION OF BACK-UP OBJECT

BACKGROUND OF THE INVENTION

There has been known such a storage apparatus as a RAID apparatus which stores therein volumes (: LUs), i.e., logical units of its memory area, and which has a replication function for making a copy of data between the volumes. Allowing such a storage apparatus to execute the copy requires that a definition be given concerning between which volume and which volume the copy should be executed, and that the storage apparatus be made to recognize this definition. Conventionally, in contrast thereto, the following technology has been known: If an instruction of the copy for a certain volume has been received, a volume is selected which becomes a partner between which and this volume the copy should be executed. Next, in the storage apparatus, the copy is executed between these pair-volumes that have become the pair (refer to, e.g., JP-A-2001-318833).

SUMMARY OF THE INVENTION

In the above-described prior art, no consideration has been given to the following problem: Replication data acquired by a copy and a volume that stores therein this replication data should be managed depending on the attributes of a file or the like which becomes the target of the copy.

The present invention has been devised in view of the above-described problem. Accordingly, it is an object of the present invention to allow the replication data and the volume that stores therein this replication data to be flexibly managed in response to the needs of a user.

In order to solve the above-described problem, in the present invention, when receiving an instruction of the backup for a file or the like which becomes the backup target, if there has been received a specification about the attributes of the backup target, a method of managing replication data acquired by the backup of this backup target, and the like, there is provided the following managing method: Namely, the specified attributes and the like are managed in a manner of being made to correspond to the replication data and a volume name into which this replication data should be stored.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram for illustrating a backup-target management table for managing attributes about backup targets or the like according to the embodiment of the present invention;

FIG. 4 is a diagram for illustrating a volume logical-configuration map table according to the embodiment of the present invention for managing information about volumes in which files becoming the backup targets or the like are stored;

FIG. 5 is a diagram for illustrating a business-operation management table for managing data necessary for executing a business-operation according to the embodiment of the present invention;

FIG. 6 is a diagram for illustrating a volume configuration information table according to the embodiment of the present invention for managing the information about the respective volumes for storing the files becoming the backup targets or the like;

FIG. 11 is a diagram for illustrating a flowchart of the algorithm according to the embodiment of the present invention for outputting replication data acquired by a backup and information on the state of a volume storing this replication data or the like;

FIG. 13 is a diagram for illustrating an output example of the replication data acquired by the backup and the information on the state of the volume storing this replication data or the like.

DETAILED DESCRIPTION OF THE EMBODIMENTS

Figure 1:
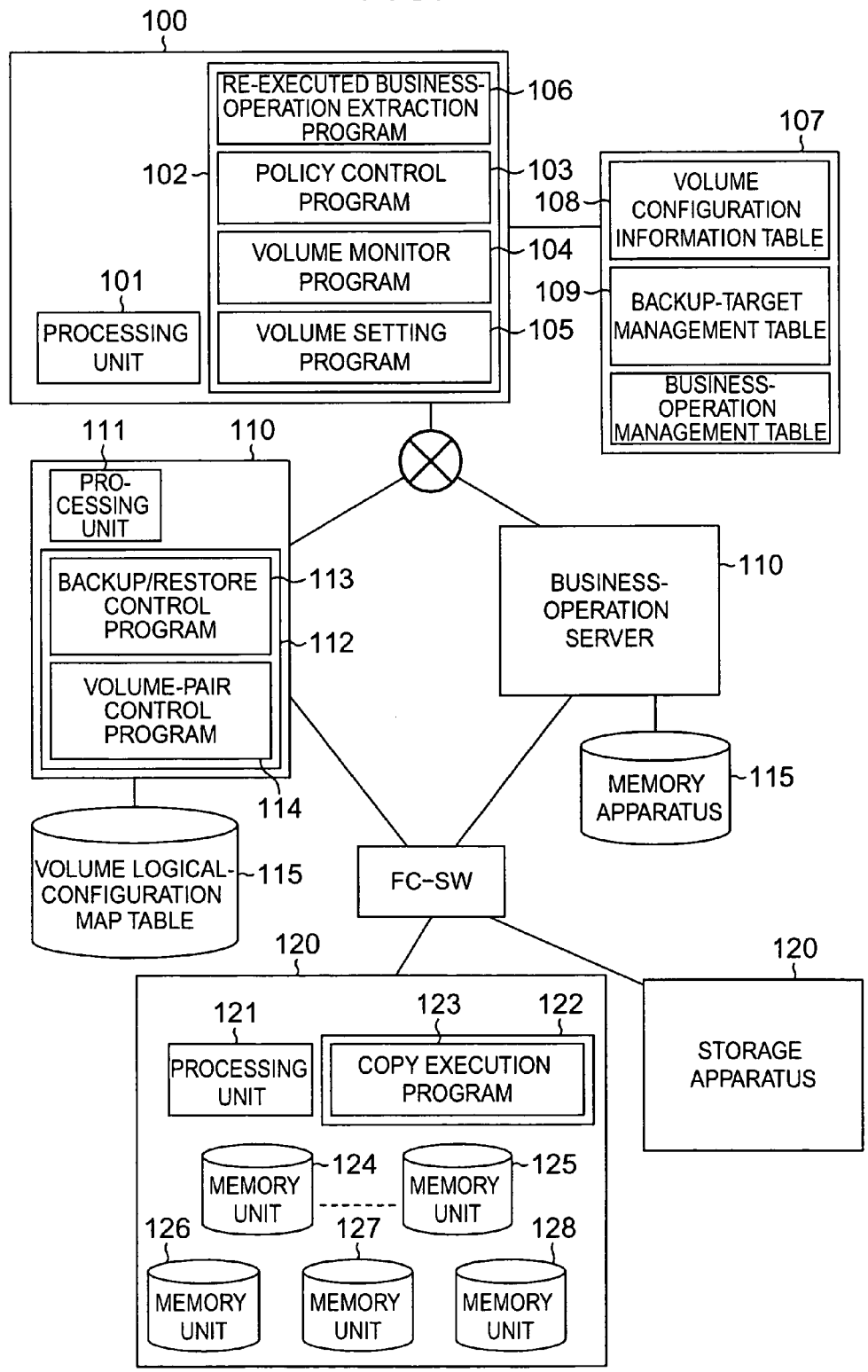
FIG. 1 is a diagram for illustrating a system configuration example for managing a copy execution between volumes according to an embodiment of the present invention.

Hereinafter, referring to the drawings, the explanation will be given below concerning an embodiment of the present invention.

Figure 2:
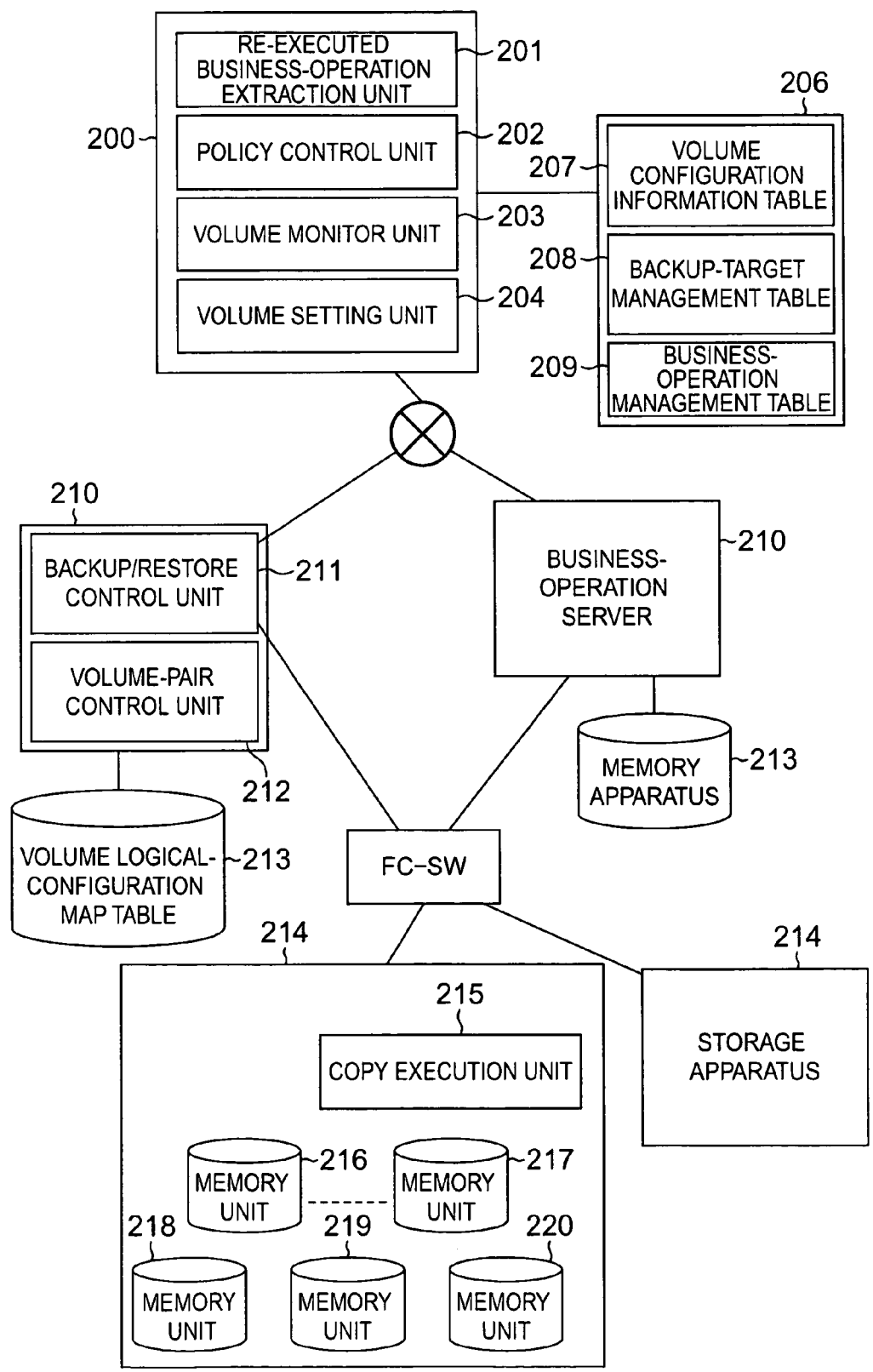
FIG. 2 is a diagram for illustrating the system configuration example according to the embodiment of the present invention, where computers included in the system in FIG. 1 are illustrated as information processing apparatuses each of which includes a function unit, the function unit including each program executed in each information processing apparatus and a hardware resource for implementing a predetermined function by operating in cooperation with each program.

FIG. 1 is a drawing for illustrating a configuration example of a system for managing a copy processing between volumes. The present embodiment includes a management server 100, business-operation servers 110, and storage apparatuses 120. The management server 100, the business-operation servers 110, and the storage apparatuses 120 are computers that include processing units 101, 111 and 121, such as CPUs, and memory units 102, 112 and 122, such as RAMs and ROMs, respectively. Here, the memory units may be located within the same or different housings as or from those of the computers. Programs stored in each memory unit are executed in each processing unit, thereby making it possible to implement predetermined functions. FIG. 2 is a diagram for illustrating the system configuration example where the management server 100, the business-operation servers 110, and the storage apparatuses 120 in FIG. 1 are illustrated as information processing apparatuses each of which includes a function unit. Here, this function unit includes each program executed in each information processing apparatus and a hardware resource for implementing each predetermined function by operating in cooperation with each program. For example, a reference numeral 202 in FIG. 2 denotes a policy control unit, which includes a policy control program 103 executed in the management server 100 in FIG. 1 and the hardware resource such as the processing unit that operates in cooperation with this program.

Also, another configuration is employable where parts of the programs and tables stored in the memory units 112 of the business-operation servers 110 and memory apparatuses 115 are stored in the memory unit 102 of the management server 100 and a memory apparatus 107, and where parts of the functions to be implemented by the execution of the programs are implemented in the management server 100. Moreover, still another configuration is selectable where parts or all of the programs and tables stored in the memory unit 102 of the management server 100 and the memory apparatus 107 are stored in the memory units 112 of the one or plural business-operation servers 110 and the memory apparatuses 115, and where parts or all of the functions to be implemented by the execution of the programs are implemented in the business-operation servers 110.

In the system illustrated in FIG. 1, between the management server 100 and the business-operation servers 110, and between the business-operation servers 110 and the storage apparatuses 120, such networks as LANs or storage area networks (: SANs) establish the connections therebetween.

The management server 100 includes the following configuration components: The policy control program 103 for setting "policies", i.e., a method for managing volumes or the like, a volume monitor program 104 for managing backup-capable volumes on each storage apparatus 120, and a volume setting program 105 for setting pairs of volumes on each storage apparatus 120. Also, the memory apparatus 107, which is connected to the management server 100, stores the following configuration components: A backup-target management table 109 for storing information about files becoming targets of the backup and a database thereabout, a volume configuration information table 108 for storing information about the state and configuration of the present volumes, and a business-operation management table for managing data necessary for executing each business-operation to be executed in each business-operation server 110. Incidentally, here, the policies mean policies for managing volumes used for the backup/restore of data and the data stored in these volumes. Also, setting the policies means that, by combining several types of options prepared in advance, a user sets the policies for the files becoming the backup targets or the like.

Each business-operation server 110 includes the following configuration components: A backup/restore control program 113 for executing the backup/restore of data in accordance with an instruction from the management server 100, and the detection of the volume information on the storage apparatus 120, and a volume-pair control program 114 for controlling the pairs of volumes on the storage apparatus 120. Also, each business-operation server 110 is equipped with (a memory apparatus for holding) a volume logical-configuration map table 115 that registers therein information for identifying a volume that stores therein data to be used in a business-operation.

Each storage apparatus 120, which each business-operation server 110 utilizes when executing a business-operation, includes the following configuration components: A copy execution program 123 for executing the backup/restore in accordance with the instruction of the backup/restore transmitted from the management server 100, a memory unit 124 for storing the files, i.e., the collection of the data, and memory units 125, 126, 127, and 128 used as backup/restore areas of the memory unit 124. Incidentally, these memory units 125, 126, 127, and 128 are logical memory areas configured by one or plural physical disks, and are logical units used at the time when the OS of each business-operation server and the one of the management server recognize each storage apparatus 120. Hereinafter, these memory units (i.e., 125, 126, 127, and 128) are referred to as "volumes" or "LUs (: logical units)".

A specific volume or volumes is or are made to correspond to each file (i.e., a collection of data recorded in each storage apparatus), and each file is a unit in terms of which the OSs manage data. The data included in each file is recorded in (a memory area on the storage apparatus equivalent to) the specific volume or volumes. When reading data in a certain file from an application or the like, the data recorded in (a memory area equivalent to) a specific volume or volumes made to correspond to the file is read out. When writing data into the file, it turns out that the data is written into (the memory area equivalent to) the specific volume or volumes made to correspond to the file. Incidentally, the number of the specific volume or volumes made to correspond to a certain file is one in some cases, and plural in other cases. Also, plural different files may be made to correspond to one specific volume.

Data whose contents are the same as the ones of data stored in "a certain volume" is written into "another volume". Let this operation be referred to as "executing a copy from "a certain volume" to "another volume". If "a certain volume" is a volume that is made to correspond to a certain file (i.e., a volume becoming the target from/into which a reading/writing of data is performed in accordance with a reading/writing request for the data of the file), and if "another volume" is a volume that is not made to correspond to the file, let the "a certain volume" and the "another volume" be referred to as "an original volume" and "a duplicate volume", respectively. The "original volume" may be called a "primary volume" while the duplicate volume" may be called a "copy volume", a "secondary volume", a "replicated volume" or a "replica".

Executing a copy from "an original volume" to "a duplicate volume" is referred to as "executing a backup". In contrast thereto, "executing a restoring" refers to executing a copy from the "a duplicate volume" to the "an original volume". Also, by executing a backup from an original volume in which "a certain data" is stored to a duplicate volume, the "a certain data" turns out to be stored into the duplicate volume. Here, data whose contents are the same as the ones of the "a certain data" is referred to as "replication data" (of the "a certain data").

"A copy" is implemented by the copy execution program executed on each storage apparatus. In each storage apparatus, a set of an original volume and a duplicate volume between which the replication of data is to be performed to each other is managed in a state of being stored as "a pair" in a table or the like. Each business-operation server 110 or the like transmits, to each storage apparatus, a pair identifier for identifying "a pair" that becomes the target for which the copy is to be made, and a replication-direction identifier for specifying the direction of the replication (i.e., whether to execute the copy from the original volume to the duplicate volume (i.e., the backup) or to execute the copy from the duplicate volume to the original volume (i.e., the restoring)). Depending on the contents of the transmitted replication-direction identifier, the copy execution program executed on each storage apparatus performs the backup or the restoring between the volumes identified by the transmitted pair identifier. Incidentally, a method for specifying the replication direction is not limited to the above-described method, but whatever method is selectable which transmits, to each storage apparatus or the like, information for allowing each storage apparatus or the like to differentiate between the backup and the restoring.

Also, in a storage apparatus, volumes managed as a pair are caused not to be managed as the pair. Let this operation be referred to as "splitting a pair" or the like. In the storage apparatus, after the copy for a certain pair has been completed, splitting the pair is performed in an arbitrary timing ranging up to a point-in-time when information for allowing an original volume (or a duplicate volume) included in the pair to be newly recognized as one partner of a pair to be formed with still another volume. Splitting the pair may be performed in accordance with an instruction from a business-operation server or the like, or may be spontaneously performed after the copy for the pair has been completed.

FIG. 3 is a diagram for illustrating an example of the backup-target management table 109, where a certain one collection of data (e.g., one database, one file, and the like) is defined as one unit (which, hereinafter, is referred to as "a backup target") and these backup targets are managed in a manner of being classified into plural groups. To each group, a group name, i.e., an identifier for identifying each group, is attached. In FIG. 3, a field 300 of "groups" stores therein the group names (A, B, and the like) for identifying the groups. Moreover, a field 301 of "backup targets" stores therein information (database names, file names, and the like) for identifying the backup targets. In FIG. 3, e.g., a database name "System" is stored in the field of "backup targets" positioned in a row where the field of "groups" is "A". This indicates that a group identified by the group name "A" includes the database "System". Incidentally, each group can be of an arbitrary combination of one or plural backup targets. For example, one collection of a series of processings executed by each computer is expressed by a unit of "business-operation", and one collection of files or the like concerned with this "business-operation" can be defined as one group.

A field 302 of "servers" stores therein names of servers that use the backup targets belonging to the respective groups. Incidentally, if, although plural backup targets belong to one and the same group, different servers use these backup targets, the server names using these backup targets may be managed on each backup target basis.

A field 303 of "expiration time-limits" stores therein information for indicating time-intervals during which replication data stored in duplicate volumes should be held.

A field 304 of "policies" stores therein instruction contents about a method of selecting a duplicate volume for storing replication data at the time of a backup, a method of managing replication data stored in a duplicate volume, and the like in a manner of being divided into a field 305 of "newest state only", a field 306 of "secondary utilization", and a field 307 of "disaster recovery". This will be explained in more detail later.

FIG. 4 is a diagram for illustrating the volume logical-configuration map table 115 that stores therein information about the configuration of the volumes that store therein the databases and files becoming the backup targets. The present table registers therein the following information: Database names 400 of the targets for which the backup/restore processing is executed, file names 401 becoming substances of the target databases, device file names 402 used for specifying the volumes storing therein the files from a business-operation server, disk IDs 403, i.e., identifiers for specifying the volumes within a storage apparatus, and housing IDs 404 for identifying housings of the storage apparatuses. The present table indicates that, e.g., a database "system" described in FIG. 4 includes a file "aaa. txt" and a file "bbb. txt" and that, of the two files, the file "aaa. txt" is stored in a volume recognized as a device file "c5t0d1" on the business-operation server 110. Also, the present table shows that the volume that stores therein the file "aaa. txt" is a volume identified by a disk ID "001" stored on a storage apparatus 120 identified by a housing ID "100".

Incidentally, in FIG. 4, the field of the database name of a file "qqq. txt" is "_". This means that "qqq. txt" is used not as a database but as a normal file. Additionally, the present table 115 is created based on the information collected by the backup/restore control program 113. The information stored in the present table is used at the time of the backup/restore processing of the volumes performed by the backup/restore control program 113.

FIG. 6 is a diagram for illustrating an example of the volume configuration information table 108 that stores therein the information about the respective volumes. The volume configuration information table registers therein the following information: Disk IDs 600 for identifying the volumes, housing IDs 601 for identifying the housings that store therein (memory areas included in) the disks, server names 602 that use the volumes, types (i.e., original volume or duplicate volume, or the like) 603 of the volumes, disk IDs 604 of volumes that become the partners when the volumes form pairs, (it is assumed that, if, in a storage apparatus, a certain original volume and a certain duplicate volume have been recognized as a pair, the original volume and the duplicate volume form the pair), and housing IDs 605 that stores therein the disks.

Also, a field 606 of "available flags" stores therein information for indicating whether or not the volumes are available as duplicate volumes. Namely, if a business-operation server or the like selects a duplicate volume that becomes the partner of a pair to be formed with a certain original volume, the server or the like makes reference to the information stored in the field of "available flags", thereby making it possible to select a volume that is usable as the duplicate volume. For example, with respect to a duplicate volume or the like that stores therein replication data wished not to be overwritten, information for indicating that the duplicate volume or the like is unusable as a duplicate volume is stored in advance into the field of "available flags". This makes it possible to prevent the replication data from being overwritten carelessly. Additionally, as the information that should be stored into "available flags", there can be mentioned, e.g., a flag for indicating that the-volume is usable as a duplicate volume.

Furthermore, if the volume has been used as a duplicate volume to store replication data therein, a field 607 of "replication data" stores therein information about attributes of the replication data. Namely, if a backup had been performed with a group name X specified and thereby the volume has stored therein replication data of a backup target x, it turns out that "X" and "x" are stored into a field 608 of "groups" and a field 609 of "backup targets", respectively. Also, if backups at plural times had been performed for one and the same backup target with one and the same group name specified, a value for indicating, of the plural backups performed for one and the same backup target with one and the same group name specified, by which time backup each created replication data had been created is stored in a field 610 of "generation numbers". For example, FIG. 6 indicates the following situation: Replication data of the backup target (i.e., the file) "aaa. txt" which, of plural backups performed for "aaa. txt" with the group name "A" specified, had been created by the first time backup is stored in a duplicate volume whose disk ID is "002" and whose housing ID is "100" (this duplicate volume is equivalent to the second row in FIG. 6).

If the volume has been used as the duplicate volume and the replication data has been written therein, the information is registered into the field 607 of "replication data". Also, even if a certain replication data has been stored therein once, if, afterwards, another replication data is written therein, the information is updated by the group name and the backup-target name corresponding to another replication data (Namely, it turns out that the field of "replication data stores therein the group name and the backup-target name corresponding to replication data which is stored in the volume at present).

A field 611 of "fault flags" stores therein information for indicating whether or not the replication data contains some kind of fault. For example, the field of "fault flags" of the duplicate volume whose disk ID is "002" and whose housing ID is "100" (i.e., the volume in the second row in FIG. 6) is "absent". This indicates that the replication data stored in this duplicate volume contains no fault.

Incidentally, the present table 108 is created by the volume monitor program 104 on the basis of the information collected by the backup/restore control program 113 on each business-operation server 110. The updating of its contents is performed at a point-in-time when, in the actual processing, the volume setting program 105 has performed the selection of volumes, or has made the volumes available, or the like.

Additionally, the volume monitor program 104 on the management server 100, through the backup/restore control program 113 on each business-operation server 110, periodically acquires the volume configuration information stored on each storage apparatus 120, thereby making it possible to store the information into the volume configuration information table 108.

Next, the explanation will be given below concerning an embodiment of the processing of classifying the respective backup targets into the groups, and of the processing of specifying the policies to the backup targets (or the groups).

If the management server 100 has received from the user a request for setting policies or groups, the policy control program 103 on the management server 100 transmits, to the backup/restore control program 113 on a business-operation server 110, information including an instruction to the effect that information about backup targets should be collected.

The backup/restore control program 113 collects the information in accordance with the instruction from the policy control program 103. Incidentally, at this time, the collected information is stored into the volume logical-configuration map table 115.

The policy control program 103 acquires the database names 400 and the file names 401, i.e., the information about the backup targets, from the volume logical-configuration map table 115, then presenting a total list of these names to the user. Additionally, as having been explained earlier, the volume logical-configuration map table may be stored into the memory apparatus 107 to which the management server 100 can make reference directly.

The user classifies the presented backup targets into groups. At this time, after setting names (i.e., the group names 300) for the respective groups, the setting of policies, such as "newest state only", "secondary utilization", and "disaster recovery" illustrated in FIG. 3, is performed for the respective groups or the respective backup targets. Also, the setting of the expiration time-limits in FIG. 3 can be performed. Additionally, if the policies and the expiration time-limits are set for the groups, one and the same policy and one and the same expiration time-limit turn out to be set for the backup targets belonging to each group. Meanwhile, if the policies and the expiration time-limits are set on each backup target basis, there exists a possibility that different policies and different expiration time-limits are set for even the backup targets that belong to one and the same group. The information inputted by the user is processed by the policy control program 103 on the management server 100, then being stored into the backup-target management table 109 as is illustrated in FIG. 3.

Next, the explanation will be given below concerning an example of the processing flow in the case where the execution of a backup is instructed on a business-operation server 110.

At first, the backup/restore control program 113 on the business-operation server 110 receives an instruction of a backup execution. When the instruction of the backup execution has been issued, there exists a necessity for receiving information for specifying a backup target that is to become the target of the backup. As methods for this, a file name or a database name for identifying the backup target may be specified, or a group to which the backup target belongs may be specified. If a group is specified, the processing can be dealt with by assuming that the instruction of the backup execution has been issued with respect to all the files and databases that belong to this group.

Additionally, the instruction of the backup execution may be given as follows: The user inputs a predetermined command or the like on the business-operation server so as to give the instruction. Also, if the backup target is the kind of data that is dealt with in a business-operation, a program or the like for managing the business-operation detects the completion of the business-operation execution, then instructing the backups of files or databases concerned with the business-operation.

When receiving the instruction of the backup execution with the file name or the like specified which is allocated for identifying the backup target, the following reception can also be allowable: A group name to which the file name or the like belongs (if the file name or the like belongs to plural groups that differ from each other, one group name out of names of the plural groups) is received by being made to correspond to the file name or the like. Otherwise, specifications of the policies and the expiration time-limit stored in the backup-target management table 109 (FIG. 3) are received by being made to correspond to the group name. Also, if the policies and the expiration time-limits are wished to be set on each backup target basis, when receiving the instruction of the backup execution with the file name or the like specified which is allocated for identifying the backup target, the following reception can also be allowable: Specifications of the policies and the expiration time-limit are received by being made to correspond to the file name or the like. The above-described processing flow makes it possible to specify a method of managing replication data of a backup target that becomes the target of a backup execution, and a method of selecting a duplicate volume for storing the replication data.

Next, the backup/restore control program 113 transmits, to the management server 100, data including the following information: Information for indicating that the instruction of the backup execution has been issued, and the backup-target name (or the group name) received for identifying the backup target, and the group name (or the policies and the expiration time-limit) the specification of which has been received in a manner of being made to correspond to the backup-target name.

If the management server 100 has received the above-described data including the group name or the like, the policy control program 103 on the management server 100 starts up, then acquiring from the backup-target management table 109 (FIG. 3) the name of the server 302 made to correspond to the group name (or the backup-target name). Also, if the group name has been specified as the information for identifying the backup target, the policy control program extracts the file name or the database name stored in the backup-target management table 109 (FIG. 3) in a state of being made to correspond to the group name.

Next, the policy control program 103 transmits, to the above-described server, data including an instruction to the effect that the configuration information about the backup target should be acquired.

Having received this data, the backup/restore control program 113 on the server acquires, from the volume logical-configuration map table 115 (FIG. 4), the disk ID and the housing ID made to correspond to the backup-target name, then transmitting information including these IDs to the volume setting program 105. If, e.g., the business-operation server receives the specification of the database name "System" as the information for identifying the backup target, and receives the specification of the group name "A" which is made to correspond to the database name "System", information of the disk ID "001" and the housing ID "100" turns out to be transmitted with respect to the backup target "System".

Figure 7:
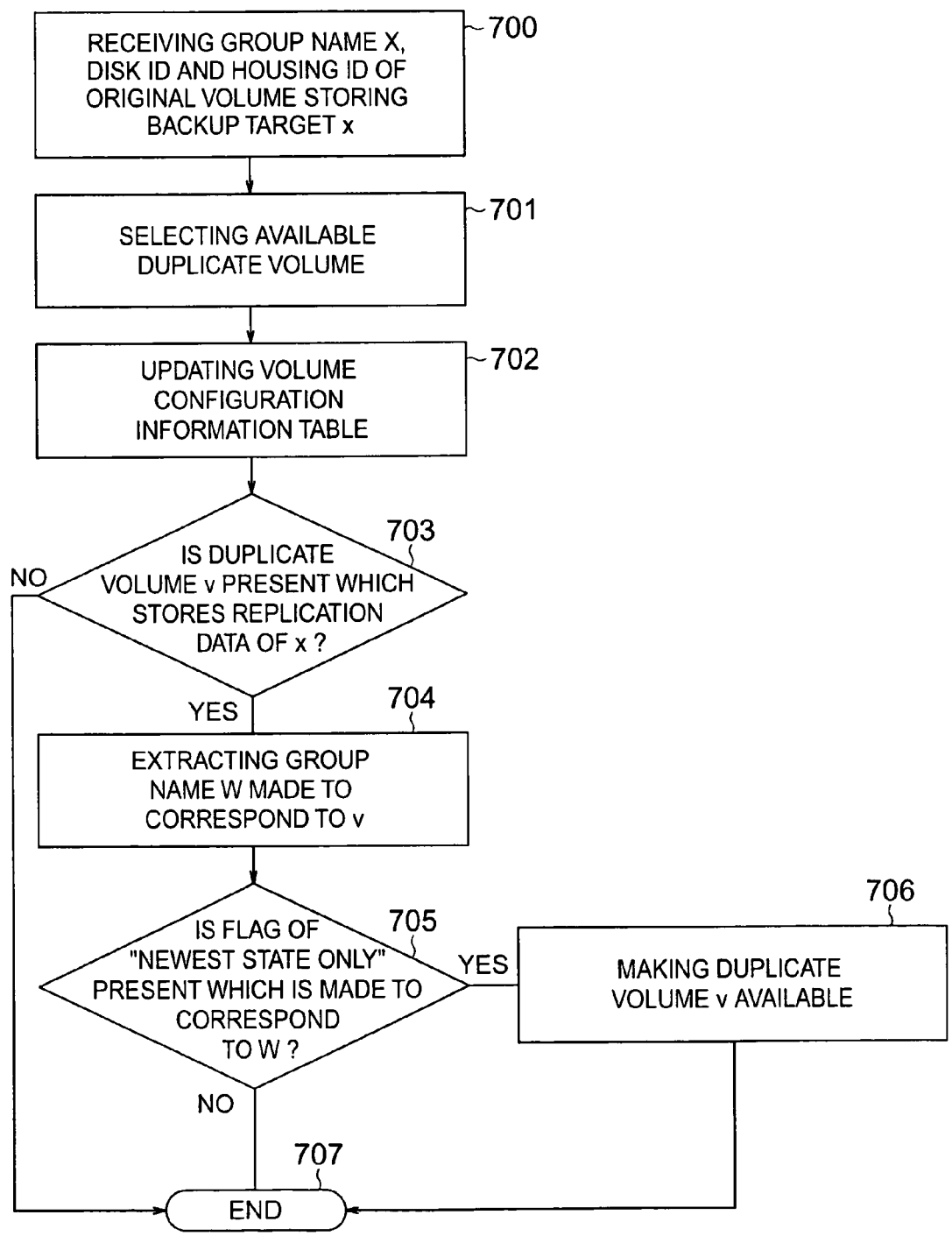
FIG. 7 is a diagram for illustrating a flowchart of the algorithm for selecting a duplicate volume to be used for a backup according to the embodiment of the present invention.
Figure 8:
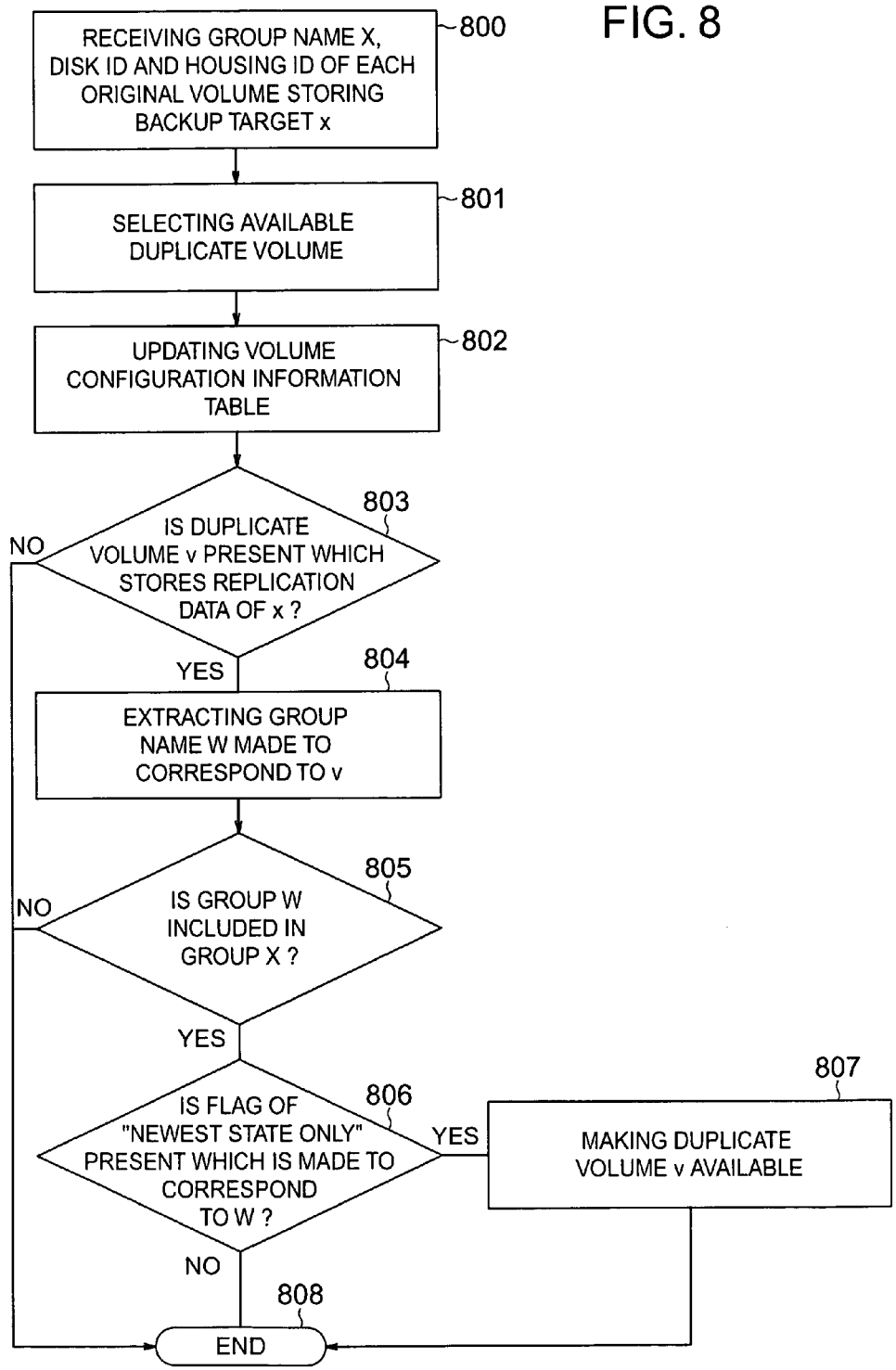
FIG. 8 is a diagram for illustrating a flowchart of the algorithm for selecting a duplicate volume to be used for a backup according to the embodiment of the present invention.

Next, based on this information, the volume setting program 105 performs the selection of a duplicate volume to be used for the backup of an original volume that has stored therein the data of the backup target. FIG. 7 and FIG. 8 illustrate flowcharts of the algorithms at this time.

If the duplicate volume to be used for the backup has been selected, pair information, which includes the original-volume name that has stored therein the backup target and the selected duplicate-volume name, is transmitted to the storage apparatus, thereby causing the storage apparatus to execute the backup from the original volume to the duplicate volume. The transmission of the pair information can be performed via the business-operation server that has received the instruction of the backup execution. Also, if the volume setting program or the like is executed in the business-operation server, it can be assumed that the pair information is transmitted directly to the storage apparatus from the business-operation server.

Here, the explanation will be given below concerning an embodiment of the method of selecting the duplicate volume. FIG. 7 is a diagram for illustrating a flowchart of the algorithm for selecting the duplicate volume according to the embodiment of the present invention. At first, the volume setting program 105 receives the information (i.e., here, the disk ID and the housing ID) for identifying the original volume (S 700). Here, the original volume stores therein the group name X that the backup/restore control program 113 has received, and the backup target x for which the instruction of the backup execution has been issued. This is exactly as having been explained earlier. Additionally, in the case where the volume logical-configuration map table 115 is held in the memory apparatus or the like to which the volume setting program can make reference directly, the series of processings, which range from the processing of receiving the instruction of the backup execution with the group name and the backup-target name specified to the processing of extracting the disk ID and the housing ID of the original volume that has stored therein the backup target, may be performed by the volume setting program itself.

Next, the duplicate volume to be used for the backup of the original volume is selected (S 701). The method of selecting the duplicate volume is as follows: The values stored in the field 606 of "available flags" in the volume configuration information table 108 (FIG. 6) are made reference to, thereby judging whether or not the volumes are usable as duplicate volumes (the judgment can be made by the presence or absence of the flags for indicating that the volumes are usable, or the like). Then, a usable duplicate volume is extracted, thereby selecting the duplicate volume.

Also, if the policies such as "secondary utilization" and "disaster recovery" are specified for the specified group name X (i.e., if the flags in the field of "secondary utilization" and that of "disaster recovery" in the backup-target management table 109 (FIG. 3) are "present"), the duplicate volume may also be selected in the following way: Namely, if the flags in the field of "secondary utilization" are "present", of the available volumes, a volume which is usable from a server that differs from the server using the original volume is selected as the duplicate volume. For example, the following selection is preferable: A volume for which the server name stored in the field 602 of "use servers" in the volume configuration information table 108 (FIG. 6) differs (from the server name stored in the field 602 of "use servers" of the original volume) is selected as the duplicate volume. Similarly, if the flags in the field of "disaster recovery" are "present", an available duplicate volume is selected which is stored in a housing that differs from the housing storing therein the original volume. In this case, the following selection is preferable: A volume for which the housing ID stored in the field 605 of "pair-housing IDs" in the volume configuration information table 108 (FIG. 6) differs (from the housing ID of the original volume) is selected as the duplicate volume.

After having selected the duplicate volume, in order to cause the storage apparatus or the like to execute the backup from the original volume, which has stored therein the backup target x, to the selected duplicate volume, the pair information which includes the original-volume name and the selected duplicate-volume name is transmitted to the storage apparatus or the like.

After the duplicate volume has been selected at S 701, the volume configuration information table 108 (FIG. 6) is updated (S 702). The contents of this updating are as follows: Namely, at first, the disk ID and the housing ID of the volume that becomes the partner of the pair are stored into the field of "pair-disk IDs" and that of "pair-housing IDs" which are each made to correspond to the original volume that has stored therein the backup target x and the selected duplicate volume. If, e.g., a duplicate volume (which is equivalent to the third row in FIG. 6) identified by "disk ID=003" and "housing ID=100" has been selected as the duplicate volume to be used for the backup of the original volume (which is equivalent to the first row in FIG. 6) identified by "disk ID=001" and "housing ID=100", "003" is stored into the field of "pair-disk IDs" made to correspond to the original volume, and "100" is stored into that of "pair-housing IDs" made to correspond thereto. Also, "001" is stored into the field of "pair-disk IDs" made to correspond to the duplicate volume, and "100" is stored into that of "pair-housing IDs" made to correspond thereto.

Moreover, "off" is stored into the field 606 of "available flags" made to correspond to the selected duplicate volume. This is performed in order to indicate that the duplicate volume is unusable for another backup that will be executed hereinafter. In this way, in the present embodiment, if a certain duplicate volume is selected as the duplicate volume to be used for the backup, the field 606 of "available flags" is updated in order to make the state of the duplicate volume unusable for another backup that will be executed thereinafter. In addition, the duplicate volume is maintained at this unusable state unless a specific instruction is issued after that. This is performed in order to protect the duplicate volume so that replication data will not be overwritten which is stored into the duplicate volume by the selection thereof as the duplicate volume and the execution of the backup.

Furthermore, the backup-target name x that has become the target of the instruction of the backup execution is stored into the field 609 of "backup targets" of the selected duplicate volume, and the group name X that has been specified at the time of the instruction of the backup execution for x is stored into the field 608 of "groups" of the selected duplicate volume. In this way, in the present embodiment, in addition to the reception of the instruction of the backup execution for the backup-target name x that becomes the target of the backup, the group name X to which the backup target x belongs is made receivable. Moreover, the group name whose specification has been received can be stored in a manner of being made to correspond to the duplicate-volume name (i.e., the information for identifying the duplicate volume) used for the backup executed in accordance with the instruction. On account of this, duplicate volumes (or replication data stored into the duplicate volumes) used for the backups of plural and the same backup targets are also made manageable by differentiating among the groups specified for the plural and the same backup targets. This, further, makes it possible to implement the following management, for example: The processing for the replication data of the same backup targets or for the duplicate volumes that store therein the replication data is changed depending on each specified group. In particular, in the case where files or the like that become backup targets are classified into groups each of which includes files concerned with a business-operation, i.e., one collection of a series of processings, files belonging to a certain group have a close relationship with each other (in a sense that the files are concerned with a business-operation corresponding to this group). Consequently, it is of great use to specify the group name (i.e., the business-operation name) when instructing the backup execution, and to manage this group name in a manner of being made to correspond to replication data (or a duplicate volume that stores therein this replication data). For example, assume a situation where files concerned with a certain business-operation are wished to be stored in the state at an execution termination point-in-time of this business-operation. In the case like this, the following management can be considered, for example: At the execution termination point-in-time of this business-operation, backups of the files concerned with the business-operation are performed with the business-operation name (or the group name for identifying a group including the files concerned with the business-operation) specified. When, afterwards, wishing to utilize these files in the state at the execution termination point-in-time of this business-operation, it is advisable just to restore a duplicate volume that stores therein replication data of these files. At this time, which duplicate volume should be restored can be known by making reference to group names (i.e., business-operation names) that, as described above, are managed in a manner of being made to correspond to duplicate-volume names (When wishing to acquire files in the state at an execution termination point-in-time of a certain business-operation, it is advisable just to restore a duplicate volume to which the business-operation name is made to correspond.).

Next, processings at S 703 or thereafter will be explained. Regarding, as an appropriate opportunity, the fact that the selection of the duplicate volume (for the backup target x) has been performed at S 701, it is judged whether or not a duplicate volume is present which has stored therein the replication data acquired by a backup previously executed for the same backup target x (S 703). This judgment can be performed, for example, by making reference to the field 607 of "replication data" in the volume configuration information table 108 (FIG. 6). Namely, it is advisable just to judge whether or not the duplicate volume is present for which the value stored in the field 609 of "backup targets" in the volume configuration information table 108 (FIG. 6) is "x".

As the result of the judgment, if it is judged that the duplicate volume is absent (: NO), the processing is terminated (S 707). Meanwhile, as the result of the judgment, if it is judged that the duplicate volume is present (: YES), the duplicate-volume name v is extracted, then extracting a group name W stored in the field 608 of "groups" in the volume configuration information table 108 (FIG. 6) in a manner of being made to correspond to the duplicate volume (S 704). If, e.g., the backup target x is "aaa. txt", the duplicate volume stored in the second row in FIG. 6 (i.e., the duplicate volume identified by the condition that the disk ID is "002" and the housing ID is "100") is extracted. Accordingly, it turns out that "A" is extracted as the group name made to correspond to the duplicate volume. Incidentally, if, at S 703, plural duplicate volumes have been extracted, it can be assumed that the processings at S 704 or thereafter will be performed for each duplicate volume extracted.

As explained above, if the replication data is present which has been acquired by the backup already executed for the backup target x that is the same as the backup target x received at S 700, the processings at S 703 and S 704 make it possible to extract the duplicate volume that has stored therein the replication data, and the group name specified at the time of the instruction of the backup execution for acquiring the replication data. Also, the execution of the backup for a certain backup target allows the acquisition of replication data of this backup target in the newest state. Regarding this fact as an appropriate opportunity, by extracting the presence or absence of the replication data acquired by a backup previously executed for this backup target, and the group name specified at that time, it becomes possible to implement a variety of managements for the replication data of this backup target.

After the group name (: W) has been extracted at S 704, reference is made to values stored in the field 304 of "policies" in the backup-target management table 109 (FIG.

3) in a manner of being made to correspond to the group name. Moreover, it is judged whether or not, of the field 304 of "policies", the field 305 of "newest state only" has stored therein a flag for indicating that this policy should be applied (S 705). If it is judged that the flag has not been stored, the processing is terminated (S 707). Meanwhile, if it is judged that the flag has been stored, "on" is stored into the field 606 of "available flags" stored in the volume configuration information table 108 (FIG. 6) in a manner of being made to correspond to the duplicate-volume name v. This is performed in order to make the duplicate volume, which is identified by the duplicate-volume name v extracted at S 703, usable for another backup that will be executed thereinafter (S 706).

As having been explained so far, the policy as to whether or not the presence of only the data in the newest state is satisfying enough is specified for the backup target belonging to the group on each group basis. This specification allows the utilization efficiency of the volume to be enhanced with the specified request satisfied. Namely, by regarding, as an appropriate opportunity, the operation of selecting the duplicate volume to be used for the backup in accordance with the instruction of the backup execution for the backup target x of the group X, the duplicate volume v is made available as a duplicate volume for the backup of another volume. Here, the duplicate volume v stores therein the replication data of the backup target x that had been acquired in accordance with the backup instruction with the group name W specified for which the policy of necessitating only the data in the newest state has been set. As a result, even if the replication data stored in the duplicate volume v has been overwritten by another replication data, the replication data (i.e., the replication data of x acquired in accordance with the backup instruction with X specified) in a newer state (In general, replication data acquired by a backup executed later in time can be said to be newer than replication data acquired by a backup executed earlier than that. This is because, since data stored in an original volume is updated with a lapse of time, the later in time the data contents are to be backed up, the newer the contents can be said to be.) is ensured for the overwritten replication data (i.e., the replication data of x acquired in accordance with the backup instruction with W specified). Consequently, the request for necessitating only the data in the newest state is satisfied for the replication data acquired in accordance with the backup instruction with W specified. Meanwhile, the duplicate volume, which has stored therein the data (i.e., the replication data of x acquired in accordance with the backup instruction with W specified) which need not be kept already (since the replication data of the data in the newer state can be acquired), is made usable for another backup that will be executed thereinafter. This condition has allowed the implementation of the effective utilization of the resource (this means that, since the volume that stores therein the unnecessary data is used for storing the necessary data, the resource (i.e., the volume) is not wasted).

Next, the explanation will be given below concerning a method of selecting the duplicate volume according to another embodiment of the present invention.

FIG. 8 is a diagram for illustrating a flowchart of indicating the algorithm for the duplicate-volume selecting method according to the present embodiment. The differences between the present embodiment and the above-described one are as follows: First of all, an instruction of the backup execution is performed in the group unit. Namely, the backup/restore control program 113 receives the instruction of the backup execution for the group name X. Moreover, with respect to all the backup targets x that belong to the group X, the backup/restore control program extracts identification information (which, here, is assumed to be a disk ID and a housing ID) for identifying each original volume that stores therein each backup target x, then transmitting these pieces of identification information to the volume setting program 105. The volume setting program receives these pieces of identification information for identifying each original volume (S 800), which starts the flowchart in FIG. 8. At S 801, each duplicate volume for each original volume specified by the disk ID and the housing ID received at S 800 is selected. In this way, the execution of the backups for all the backup targets belonging to the group becomes necessary in the case where each group includes files concerned with a business-operation (i.e., one collection of processings) or the like. Namely, if, e.g., files concerned with each business-operation are wished to be backed up in the state at a point-in-time when the execution of each business-operation had been completed, the backups of the files concerned with each business-operation need to be executed at the point-in-time when the execution of each business-operation had been completed.

A processing at S 802 for updating the volume configuration information table 108 (FIG. 6) is basically the same as the one in the above-described embodiment. In the present embodiment, however, the selection of the duplicate volumes (S 801) is performed for all the backup targets that belong to the group specified at S 800. Accordingly, the updating of the volume configuration information table 108 (FIG. 6) is also performed for each original volume that stores therein each backup target and each duplicate volume selected for each original volume.

Next, with respect to each backup target x belonging to the group X, processings from S 803 to S 807 will be performed. The processings at S 803 and S 804 are basically the same as the ones in the above-described embodiment. At S 805, it is judged whether or not a group W extracted at S 804 is included in the group X (i.e., whether or not all the backup targets belonging to W belong to X). Furthermore, only if it is judged that W is included in X, "on" is written into the field 606 of "available flags" (illustrated in FIG. 6 and) made to correspond to a duplicate volume. Here, the duplicate volume has stored therein replication data of a backup target (belonging to W and) backed up with W specified (This kind of duplicate volume can be extracted by making reference to the volume configuration information table 108 (FIG. 6). Namely, it is advisable just to extract a duplicate volume for which "W" is stored in the field 608 of "groups".).

The above-described processings allow the implementation of the following operation: Only if the replication data in a newer state has been acquired for all the backup targets belonging to W, all the duplicate volumes are made available which store therein the replication data of the backup targets belonging to W. In addition, the processings allow the prevention of the following situation: Only a part of the duplicate volumes which store therein the replication data of the backup targets belonging to W is obliged to be made available (, and resultantly, is obliged to be overwritten by another replication data).

Additionally, as the algorithm for implementing the present embodiment, the following one is selectable: Namely, after the processing at S 802, at first, reference is made to the backup-target management table 109 (FIG. 3), thereby judging whether or not a group W is present which is included in the group x. If the group W is absent, the processing is terminated. Meanwhile, if the group W is present, W is extracted. Then, reference is made to the volume configuration information table 108 (FIG. 6), thereby judging whether or not a duplicate-volume name is present for which the value stored in the field 608 of "groups" is "W". If the duplicate-volume name is present, the one is extracted. Moreover, reference is made to the backup-target management table 109 (FIG. 3), thereby judging whether or not the value in the field 305 of the policy of "newest state only" stored in a manner of being made to correspond to W is "flag is present". If the value is "flag is present", "on" is written into the field 606 of "available flags" in the volume configuration information table 108 (FIG. 6) in order to make the extracted duplicate volume usable for a backup thereinafter.

Next, the explanation will be given below concerning a processing of outputting (i.e., displaying onto a display picture or the like) the state of replication data stored into a duplicate volume by the execution of a backup.

FIG. 13 illustrates an example of the display picture for outputting information about the state of replication data. In FIG. 13, a field 1300 of "groups" displays group names. A field 1301 of "backup targets" displays information such as database names, file names, and the like for identifying backup targets. A field 1302 of "replication data" implements the following display: A one-time backup (i.e., a series of processings which range from the selection of a duplicate volume in accordance with an instruction of a backup to the storage of replication data into the duplicate volume) and one icon are made to correspond to each other, and these respective icons are displayed in a manner of being arranged in compliance with a sequence (which may be a sequence in which the backups have been completed in the storage apparatus or the like, or may be a sequence in which the duplicate volumes have been selected) in which the backups have been performed (FIG. 13 indicates that, as each numeral (i.e., 1, 2, 3 and the like) distributed from left to right becomes smaller, each backup expressed by each icon displayed in a column of each numeral was performed more previously). For example, in FIG. 13, five-time backups have been performed for "System" with the group specified which is identified by the group name A, and five icons corresponding to the respective five-time backups are displayed in the field 1302 of "replication data". Furthermore, icons emptied in white or icons coated in black are displayed, depending on the state of replication data stored into duplicate volumes by the respective backups (or the duplicate volumes that store therein the replication data).

What is referred to as "the state" here is as follows, for example: First of all, there exits a state where, in accordance with an instruction of the backup execution for a certain backup target, the selection of a duplicate volume has been performed (or, the backup has been actually performed using the duplicate volume). Also, there exits a state where a duplicate volume that stores therein a certain replication data is available for another backup (or, the duplicate volume has been selected as a one to be actually used for another backup, or different replication data is stored by the execution of another backup).

Incidentally, a method for indicating that the states of the replication data are different is not limited to the method of changing the type of the icons. For example, the different states may also be displayed by adding some kind of notation (e.g., "x" or the like) thereto in a manner of being made to correspond to one type of icon.

Figure 11:
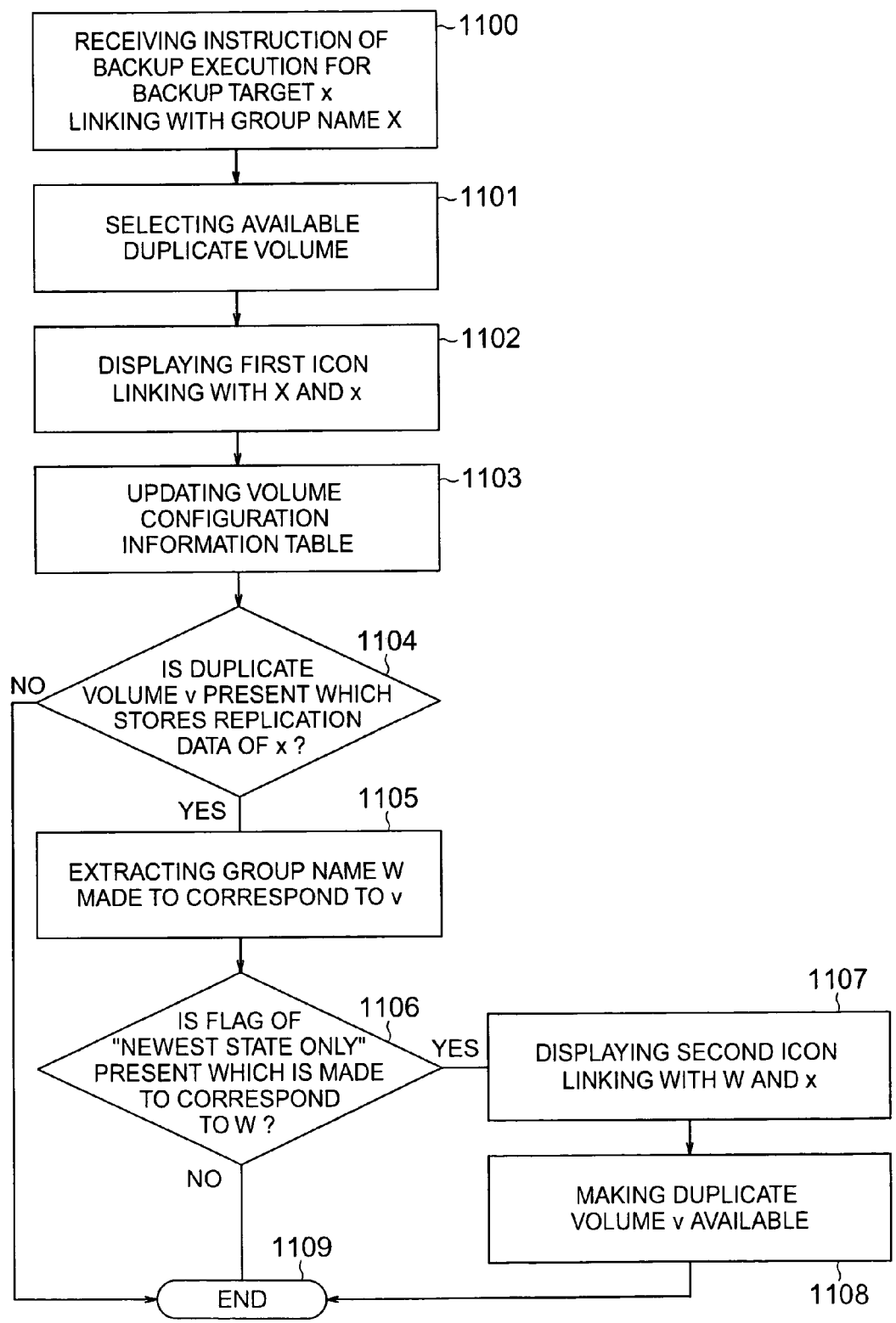

Next, referring to FIG. 11 and the like, the explanation will be given below concerning an embodiment of the method for implementing the display as is illustrated in FIG. 13. FIG. 11 illustrates a flowchart of indicating the algorithm according to the present embodiment. The flowchart illustrated in FIG. 11 results from adding S 1102 and S 1107 to the flowchart illustrated in FIG. 7 for selecting the duplicate-volume. Namely, the present embodiment implements the display as is illustrated in FIG. 13 in such a manner that the display is accompanied by the processing of selecting the duplicate volume. Since the steps other than S 1102 and S 1107 are the same as those in FIG. 7, only S 1102 and S 1107 will be explained. At S 1101 in FIG. 11, when the volume setting program 105 has performed the processing of selecting the duplicate volume, a first icon is displayed in a manner of being made to correspond to the group name X specified at S 1100 and the backup-target name x that has become the instruction target of the backup execution (S 1102). The mere selection of the duplicate volume does not mean that the backup has been actually performed to acquire the replication data. If, however, the backup processing in the storage apparatus or the like has been finished normally, it turns out that the selection of the duplicate volume results in the acquisition of the replication data (although the timing is late a little bit). On account of this, when the allocation of the duplicate volume has been performed, the first icon is displayed which is intended for indicating that the replication data has been acquired. Additionally, after the duplicate volume has been selected, the first icon may be displayed after confirming that the backup has been completed in the storage apparatus or the like.

Next, S 1107 will be explained. At S 1107, a processing is performed which is intended for modifying the first icon to a second icon that is displayed in a manner of being made to correspond to the group name W and the backup target x. This processing is performed in order to indicate that, as the result of the judgment at S 1106, the duplicate volume that has stored therein the replication data acquired by the backup of x executed with W specified is made available for another backup.

The above-described processings make it possible to know the state of the replication data of the backup target in the case where the backup instruction has been issued with the group specified, and the state of the duplicate volume that has stored therein the replication data.

There exists the case where plural business-operations (each of which is one collection of a series of processings executed on each computer) are set such that the plural business-operations will be executed in accordance with a predetermined sequence. For example, with respect to three business-operations of A, B, and C, the three business-operations are set such that B will be executed after A has been terminated and further, C will be executed after B has been terminated.

As having been described earlier, there exists the case where files or the like concerned with each business-operation are wished to be utilized in the state at a point-in-time when the execution of each business-operation had been completed. Usually, data stored in an original volume continues to be updated one after another. Accordingly, if a certain extent of time has elapsed from a point-in-time when the execution of a business-operation had been completed, the files stored in the original volume have been already updated from the state at the execution completion point-in-time of this business-operation. In this case, assume that, with respect to the files or the like concerned with the business-operation, the user wishes to utilize the data in the state at the execution completion point-in-time of this business-operation. The implementation of this user's wish requires that the data in the state at the execution completion point-in-time of this business-operation with respect to these files or the like be backed up into a duplicate volume in advance, and that replication data stored into the duplicate volume be restored.

Here, if the user or the like specifies a backup target that the user or the like wishes to restore and also, with respect to this backup target, specifies of which business-operation the user or the like wishes to restore replication data in the state at an execution completion point-in-time, it is required to identify and transmit, to the storage apparatus or the like, a duplicate-volume name that has stored therein the replication data which should be employed as the target of the restoring. Hereinafter, the explanation will be given below concerning an embodiment of the method that, when the specification of a business-operation and a backup target has been received, extracts a duplicate volume that has stored therein replication data of the specified backup target at an execution completion point-in-time of the specified business-operation.

First of all, each backup target that should be backed up in the state at a point-in-time when the execution of each business-operation had been completed is managed in advance by being stored into the backup-target management table 109 (FIG. 3) in a manner of being made to correspond to each group name (or each business-operation name) for identifying each business-operation. For example, a group name (or a business-operation name) for identifying a business-operation is stored into the field of "groups" in the backup-target management table 109 (FIG. 3). Simultaneously, a backup-target name that is wished to be backed up in the state at a point-in-time when the execution of the business-operation had been completed is stored into the field of "backup targets" in a manner of being made to correspond to the group name. Also, depending on requirements, values for indicating instruction contents that are wished to be set can also be stored into the field 304 of "policies" or the like.

With respect to these respective backup targets, the selection of each duplicate volume is performed in accordance with the flowchart illustrated in FIG. 7 or FIG. 8. Then, the instruction of the backup execution using each selected duplicate volume is transmitted to the storage apparatus or the like. Here, when receiving the instruction of the backup execution, the specification of each group name (or each business-operation name) for identifying each business-operation is also received. Then, the processing in FIG. 7 or FIG. 8 is executed with respect to each backup target stored in the backup-target management table 109 (FIG. 3) in a manner of being made to correspond to each group name. The replication data backed up by this method and each duplicate volume that stores therein the replication data are managed as indicated in the volume configuration information table 108 (FIG. 6). This is exactly as having been explained earlier.

Next, if, in order to identify replication data that is wished to be acquired by the restoring, the backup/restore control program 113 has received the specification of a group name X (or a business-operation name X) for identifying a business-operation and a backup-target name x, X and x are transmitted to the volume setting program 105. Having received X and x, the volume setting program 105 performs processings explained below:

At first, a duplicate-volume name is extracted for which "X" is stored in the field of "groups" in the volume configuration information table 108 (FIG. 6) and "x" is stored in the field of "backup targets" therein. In addition, in order to receive the instruction of the restoring execution for this duplicate volume, the extracted duplicate-volume name may be displayed on a display unit of the user terminal, or the execution of the restoring for this duplicate volume may be automatically instructed toward the storage apparatus or the like. As explained above, when receiving the instruction of the backup execution for each backup target, each backup-target name and each group name (or each business-operation name) are received. Then, each backup-target name and each group name the specification of which has been received are managed in advance, e.g., by being stored into the table 109 (FIG. 3) in a manner of being made to correspond to each duplicate-volume name that stores therein the replication data about each backup target. When having received the specification of the backup-target name x and the group name X (or the business-operation name X) for identifying the replication data that is wished to be restored, the above-described management makes it possible to easily extract the duplicate-volume name which has stored therein the replication data.

In the above-described processings, it is assumed that the specified replication data has been stored in any one of the respective duplicate volumes. Depending on the set policies, however, there are cases where a duplicate volume that stores therein replication data of a certain backup target has been used for another backup, and thus the replication data has been already overwritten. Also, there are cases where, if there has occurred a fault to the server for executing a business-operation or the like, some kind of defect is contained in data of a backup target generated in accompaniment with the execution of the business-operation, and where a defect is contained in replication data as well which is acquired by the backup of the data containing the defect. Moreover, as described above, when plural business-operations are executed in accordance with a predetermined sequence, there are cases where a subsequent business-operation is executed by utilizing data generated by the execution of a previous business-operation. In this case, there are cases where, if some kind of defect is contained in the data generated by the execution of the previous business-operation, a defect is contained in data as well which is generated by the subsequent business-operation executed by utilizing the data generated by the execution of the previous business-operation. If, in this way, a defect is contained in replication data, restoring this replication data does not make it possible to acquire data that should be wished to be utilized.

Hereinafter, assume the following case: Replication data of a certain backup target in the state at a point-in-time when the execution of a certain business-operation (: X) had been completed is wished to be acquired by the restoring. The restoring, however, is not executable because the replication data contains a defect, or, even if the replication data contains no defect, the replication data itself has been already overwritten or disposed, or the like. At this time, all the files or the like necessary for the execution of the business-operation X are acquirable by the restoring. Simultaneously, if these files contain no defect, the business-operation X is executed once again by restoring and utilizing these files. This execution makes it possible to acquire the replication data in the state at the point-in-time when the execution of X had been completed. If, however, there exits a defect in the replication data of the files or the like necessary for the execution of the business-operation X, there exits a possibility that executing X by utilizing this replication data results in only the acquisition of the data containing a defect. Also, if replication data of a business-operation executed more previously than X has been lost because of the overwriting, it is impossible to execute X by utilizing this replication data.

Meanwhile, of the plural business-operations to be executed in accordance with the predetermined sequence, the business-operation that should be executed in the first place is not executed by utilizing files or the like in the states at execution completion point-in-times of the business-operations to be executed thereinafter. Consequently, the series of business-operations which range from the business-operation in the first place to the specified business-operation name X are executed in accordance with the predetermined sequence. This execution makes it possible to acquire the files or the like in the state at the execution completion point-in-time of the business operation X. In this case, however, it turns out that, if there exist many business-operations that should be executed before the execution of the business operation X, it takes a time by the amount.

As for the user, the user has a request for acquiring, in the shortest time possible, the data in the state at the execution completion point-in-time of the business operation X. On account of this, it is convenient if it can be judged which business-operation should be executed once again. In an embodiment explained hereinafter, there can be provided information that, when the specification of the business-operation name X and the backup-target name x has been received from the user, indicates which business-operation should be executed once again in order to acquire the data of x in the state at the execution completion point-in-time of X.

Figure 9:
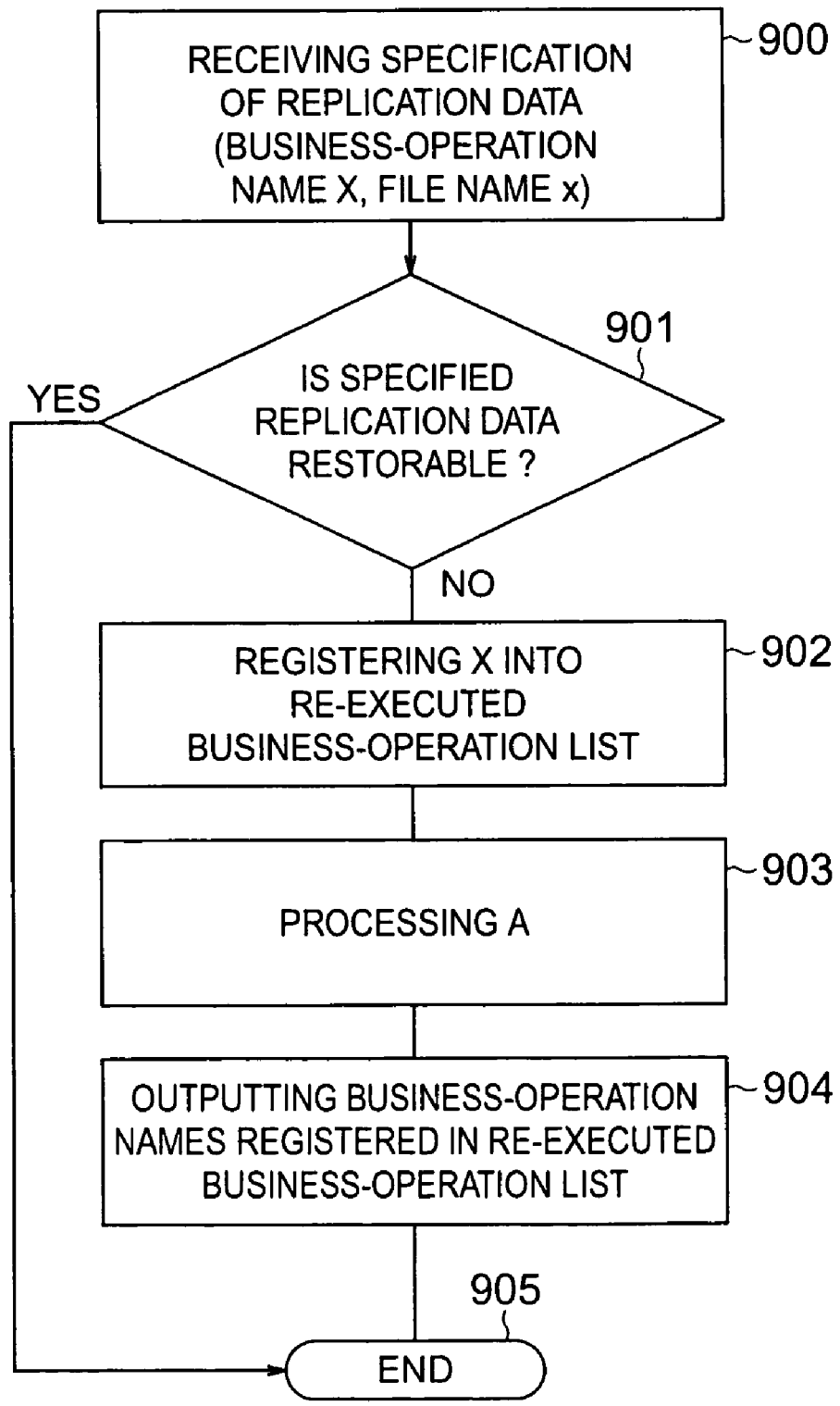
FIG. 9 is a diagram for illustrating a flowchart of the algorithm according to the embodiment of the present invention for receiving a specification of a file or the like which has become the target of a backup, and for extracting a business-operation to be executed for acquiring data on the backup target.

Hereinafter, the explanation will be given below concerning the embodiment of the method that, when the information for identifying the replication data wished to be utilized has been received, extracts a business-operation name that should be executed once again in order to generate data whose contents are the same as the ones of the replication data. FIG. 9 is a diagram for illustrating a flowchart of the algorithm of the present embodiment. This flowchart is executed by a re-executed business-operation extraction program 106.

The re-executed business-operation extraction program 106, at first, receives the information for identifying the replication data wished to be utilized (S 900). As methods for identifying the replication data, there can exist many types of methods. For example, the replication data can be identified by the group name X (or the business-operation name X) and the backup-target name x (or the file name x or the like) for identifying the business operation. Also, if backups at plural times had been executed for one and the same backup target with one and the same business-operation specified, "generation numbers" for identifying by which time backup each acquired replication data had been acquired can also be received along with the above-described information. For example, if three types of business-operations identified by business-operation names A, B, and C are executed by being repeated in accordance with this sequence, replication data of the file bbb. txt acquired by the backup executed with the business-operation name B specified which is executed in the third time repetition turns out to be identified by "X=B", "x=bbb. txt", and "i=3" (which, hereinafter, will be represented as Xi (bbb. txt)).

Next, reference is made to the field 607 of "replication data" (and the field 611 of "fault flags") in the volume configuration information table 108 (FIG. 6), thereby judging whether or not the specified replication data is restorable (S 901). Here, "restorable" may refer to "the replication data has been stored in any one of the duplicate volumes", or may refer to "the replication data has been stored in any one of the duplicate volumes, and the replication data stored in a certain duplicate volume contains no fault of any kind". Here, by making the following judgment, it can be identified in which duplicate volume the replication data has been stored: Namely, reference is made to the volume configuration information table 108 (FIG. 6), thereby judging whether or not replication data whose business-operation name (group name), file name (backup-target name), and generation number coincide with those specified at S 900 has been stored in the field 607 of "replication data". Also, whether or not the replication data stored in this duplicate volume contains a fault can be judged by executing a fault detection program for detecting a fault in the replication data. In the present embodiment, whether or not each replication data stored in the volume configuration information table contains a fault may be judged using the fault detection program with an arbitrary timing, and its result may be stored into the field 611 of "fault flags". Otherwise, at the time of executing the processing at S 901, the presence or absence of the fault for the replication data may be judged (using the fault detection program).

As the result of the judgment at S 901, if it is judged that the specified replication data is restorable, the processing is terminated (S 905). At this time, a notice to the effect that the specified replication data is restorable, the duplicate-volume name that has stored therein the specified replication data, and the like may be outputted (e.g., displayed on the display picture). This allows the user to know the duplicate-volume name used when instructing the storage apparatus or the like to restore the specified replication data stored in the duplicate-volume name.

Meanwhile, as the result of the judgment at S 901, if it is judged that the specified replication data is not restorable, the business-operation name X is registered into "re-executed business-operation list" (S 902). Here, "re-executed business-operation list" is a table including business-operation names that need to be executed once again in order to acquire the data whose contents are the same as the ones of the replication data specified at S 900.

Next, at S 903, a processing A is executed with the business-operation name X employed as its input value. The processing A, which is illustrated by a flowchart in FIG. 10, will be explained later. When the processing A has been terminated, the business-operation names registered in the re-executed business-operation list are outputted (S 904), and then the processing is terminated (S 905). Incidentally, the re-executed business-operation list has a possibility of being updated in the processing A.

Next, referring to the flowchart in FIG. 10, the explanation will be given below concerning the processing A. The processing A is started by receiving one business-operation name or plural business-operation names as its input value or values (S 1000). If the plural business-operation names are received, processings from S 1001 to S 1005 are executed on each input-value basis.

At first, an input value is substituted into a variable Y (S 1001). If, subsequently to S 902 in FIG. 9, the processing A is executed for the first time, the input value is the business-operation name X, and thus Y assumes the value X. Next, it is judged whether or not replication data of data necessary for the execution of a business-operation identified by Y is restorable (S 1002). In order to extract the replication data necessary for the execution of Y, it is advisable just to make reference to the business-operation management table (FIG. 5), and thereby to extract a file name or file names or the like stored in a field 501 of "necessary data" in a manner of being made to correspond to "Y" stored in a field 500 of "business-operation names". As information for identifying the data, identifiers each of which includes a combination of a business-operation name (or group name) and a file name (or database name) are used in the field 501 of "necessary data" in the business-operation management table (FIG. 5). For example, the replication data of the file aaa. txt acquired by the execution of the business-operation A is represented as (A, aaa. txt). Also, in addition to the business-operation name and the file name, when wishing to identify the replication data by using the above-described "generation number" as well, the employment of an identifier including a combination of these three values makes it possible to identify the replication data. The judgment as to whether or not each replication data extracted as the data necessary for the execution of Y is restorable can be made by making reference to the field 607 of "replication data" (and the field 611 of "fault flags") in the volume configuration information table 108 (FIG. 6). This is exactly as having been explained in the explanation of the processing at S 901 in FIG. 9.

As the result of the judgment at S 1002, if it is judged that all the replication data necessary for the execution of Y are restorable, or if there exists none of the data stored in the business-operation management table (FIG. 5) as the data necessary for the execution of Y, the processing is terminated (S 1005). In the present embodiment, even if a processing A with a certain business-operation name (or group name) selected as its input value has been terminated, if a processing A with another business-operation name selected as its input value is being executed (or is in a state of being to be executed), the processing does not proceed to S 904. Moreover, at a point-in-time when all the processings A that are being executed (or are to be executed) have been terminated, the processing proceeds to S 904. As a method for managing the processings A that are being executed (or are to be executed), it is advisable just to provide a method as is explained below, for example: Namely, at S 903, or at S 1000 in FIG. 10 which will be described later, if a processing A is called up for an input value, there is provided an execution-state management table for storing therein this input value and a flag in a manner of being made to correspond to each other. Here, this flag is a one for indicating whether or not the processing A for this input value has been terminated. Furthermore, for example, at the point-in-time when the processings A for all the input values have been terminated, the execution-state management table is checked, thereby judging whether or not there exists an input value for which the flag for indicating the termination of the processing A has been not stored. As the result of this judgment, if the processings A for all the input values have been terminated, the processing proceeds to S 904.

Meanwhile, as the result of the judgment at S 1002, if it is judged that there exit replication data that are non-restorable, business-operation names for identifying the replication data judged to be non-restorable are extracted (S 1003). Additionally, the set of the extracted business-operation names is defined as {W1, W2, . . . , Wk}.

Next, the extracted business-operation names {W1, W2, . . . , Wk} are registered into the re-executed business-operation list described earlier (S 1004). In addition, executions of the processings A with the respective business-operation names {W1, W2, . . . , Wk} employed as their input values are started (S 1000). In this case, the respective processings A with the respective business-operation names Wi employed as their input values are executed independently of each other.

Incidentally, the following assumption is made: Namely, the replication data necessary for the execution of each business-operation that should be executed in accordance with the predetermined sequence is (a file, or a database, i.e., a collection of files, including) the data acquired by the execution of a business-operation that should be executed before each business-operation. Simultaneously, executing a business-operation that should be executed in the first place necessitates none of the data acquired by the execution of any other business-operation. Under the assumption like this, it can be proved that the processings A are sure to be terminated without fail. The reason for this is as follows: Namely, if a processing A is started with a certain business-operation name Y selected as its input value, each business-operation name Wi, which identifies the replication data and will be extracted at S 1003, is sure to correspond to a business-operation without fail which should be executed before the execution of Y. If this is the case, in the processing A executed by being repeated in the number of times that is equal to, at most, the number of the business-operations executed, a state where nothing can be extracted as the replication data necessary for the execution of Y turns out to occur at S 1002 (this is based on an assumption that, with respect to at least the business-operation that should be executed in the first place, nothing is stored in the field 501 of "necessary data" in the business-operation management table (FIG. 5)).

Figure 10:
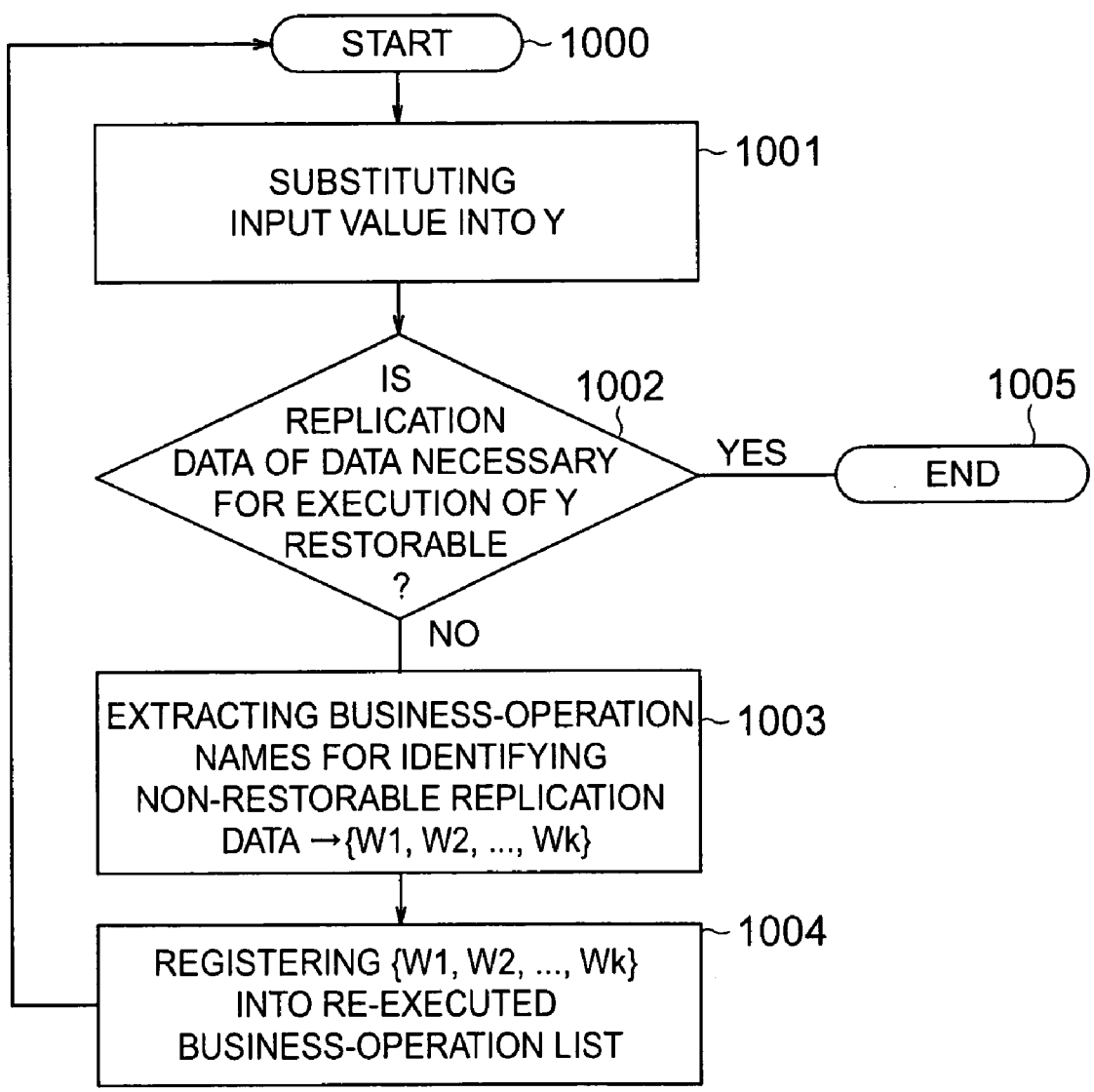
FIG. 10 is a diagram for illustrating a flowchart of the algorithm according to the embodiment of the present invention for receiving a specification of a file or the like which has become the target of a backup, and for extracting a business-operation to be executed for acquiring data on the backup target.

As having been explained so far, the business-operations, which have been acquired as the result of the executions of the processings illustrated by the flowcharts in FIG. 9 and FIG. 10 and have been stored in the re-executed business-operation list, are executed in accordance with the predetermined sequence. This execution makes it possible to acquire the data whose contents are the same as the ones of the replication data specified at S 900.

Here, using a simplified concrete example, the explanation will be given below concerning the processings in FIG. 9 and FIG. 10. Now, consider the case where five business-operations A, B, C, D, and E are executed in accordance with this sequence. Moreover, it is assumed that the replication data necessary for the execution of the respective business-operations A, B, C, D, and E that should be executed in accordance with this sequence are exactly as indicated in the business-operation management table illustrated in FIG. 5. Furthermore, it is also assumed that, of the replication data stored in the field 501 of "necessary data" in the business-operation management table in FIG. 5, two pieces of replication data (B, bbb. txt) and (D, ddd. txt) are non-restorable, and all the remaining replication data are restorable.

Now, it is assumed that, at S 900 in FIG. 9, the specification of replication data identified by the business-operation name E and the file name x is received. Also, it is assumed that the replication data is non-restorable. At this time, since the answer at S 901 is judged to be "NO", the processing proceeds to S 902, at which E is registered into the re-executed business-operation list. Next, the execution of the processing A is started with the business-operation name E employed as its input value (S 903).

In the processing A illustrated in FIG. 10, at first, the input value E is substituted into Y (S 1001). Moreover, reference is made to FIG. 5, thereby extracting three replication data (A, aaa. txt), (B, bbb. txt), and (D, ddd. txt) as the replication data necessary for the execution of Y=E. Since, of these three replication data, (B, bbb. txt) and (D, ddd. txt) are non-restorable, the corresponding answer at S 1002 is judged to be "NO". Next, B and D are extracted as these non-restorable replication-data names (S 1003), then being registered into the re-executed business-operation list (S 1004). At this point-in-tome, it turns out that E, B, and D have been registered in the re-executed business-operation list. In addition, the executions of the processings A with the respective B and D employed as their input values are started (S 1000).

At first, the processing A to be executed with B employed as its input value will be explained. At first, at S 1001, B is substituted into Y. Next, as the replication data necessary for the execution of Y=B, (A, aaa. txt) is extracted which is stored in the business-operation management table in FIG. 5, then judging whether or not (A, aaa. txt) is restorable (S 1002). Here, since (A, aaa. txt) has been assumed to be restorable, the answer is judged to be "YES", and then the processing A with B employed as its input value is terminated (S 1005).

Next, the processing A to be executed with D employed as its input value will be explained. At first, at S 1001, D is substituted into Y. Furthermore, as the replication data necessary for the execution of Y=D, (A, aaa. txt) and (C, Temp) are extracted which are stored in the business-operation management table (FIG. 5), then judging whether or not (A, aaa. txt) and (C, Temp) are restorable (S 1002). Here, since both of the two pieces of replication data have been assumed to be restorable, the answer is judged to be "YES", and then the processing A with D employed as its input value is terminated (S 1005).

When both of the processings A with B and D employed as their input values have been terminated, there exists none of the other processings A that should be executed, and accordingly the processing proceeds to S 904 in FIG. 9. Here, the business-operation names E, B, and D registered in the re-executed business-operation list are outputted. These three business-operations are executed in accordance with the sequence determined just as described above, i.e., the sequence of B, D, and E. This execution has allowed the acquisition of the replication data specified at S 900. In this way, the application of the present embodiment has made it possible to extract the minimum-essential business-operations that should be executed in order to acquire the specified replication data.

Figure 12:
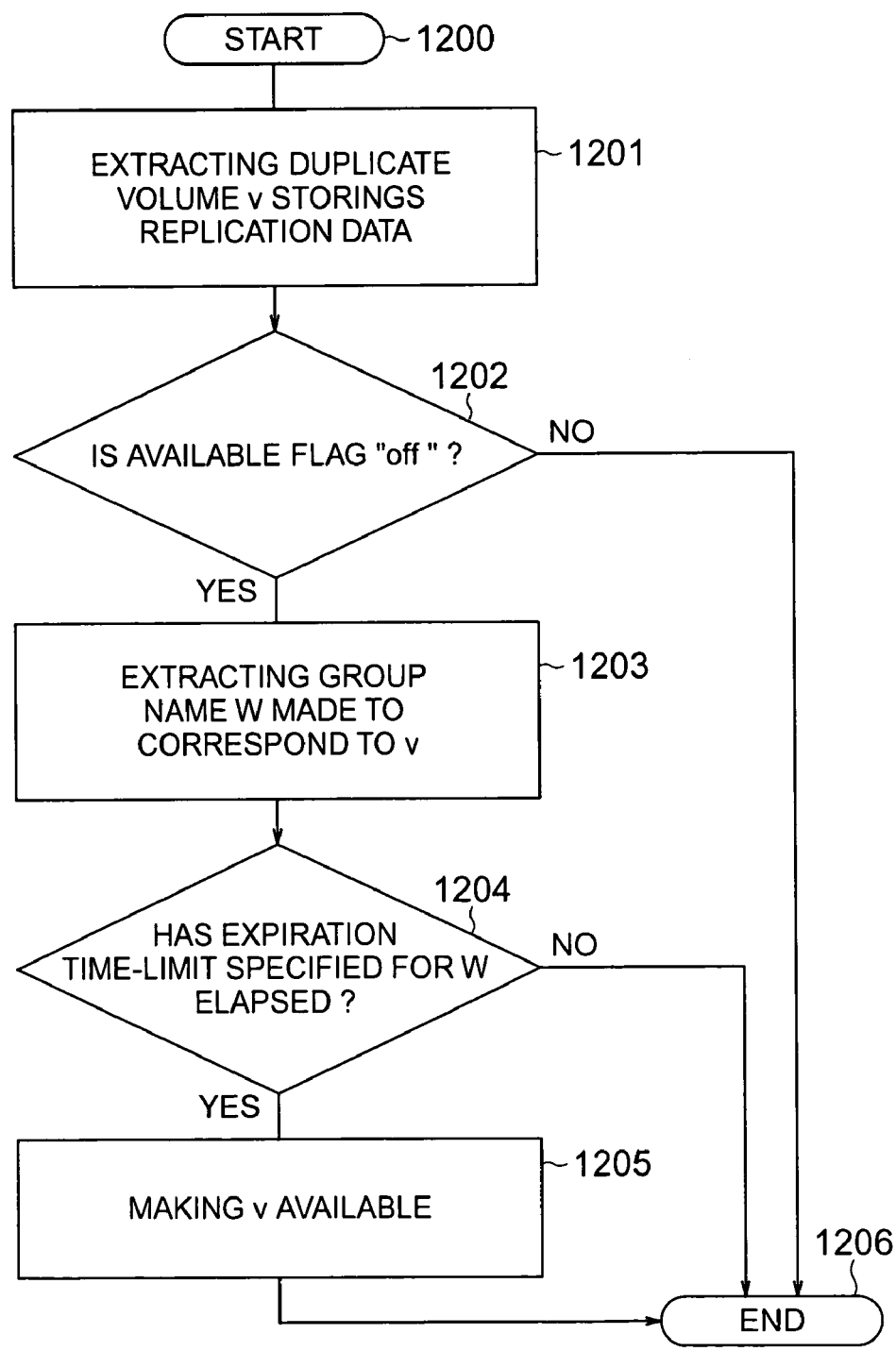
FIG. 12 is a diagram for illustrating a flowchart of the algorithm according to the embodiment of the present invention, whereby a duplicate volume used for a backup is managed depending on an expiration time-limit of replication data stored in the duplicate volume.

Next, the explanation will be given below concerning an embodiment whereby, depending on an expiration time-limit of replication data, a duplicate volume that stores therein the replication data is made available. The algorithm according to the present embodiment will be explained below, using a flowchart illustrated in FIG. 12. The flowchart in FIG. 12 is executed by the volume monitor program 104 on the management server 100.

At first, reference is made to the volume configuration information table 108 (FIG. 6), thereby extracting the duplicate-volume name v that stores therein the replication data (In FIG. 6, the information including the disk ID and the housing ID is used as the duplicate-volume name) (S 1201). Whether or not the replication data is stored therein can be checked by judging whether or not the information about the replication data is stored in the field 607 of "replication data" in the volume configuration information table 108.

In general, there can exist plural duplicate volumes which store therein replication data. Which duplicate-volume name should be extracted from among these duplicate-volume names may be determined by the following methods: Namely, the duplicate-volume name is extracted which satisfies a condition that a point-in-time when the replication data stored in the duplicate volume was backed up is the second oldest in comparison with a point-in-time when replication data stored in a duplicate volume extracted last time had been backed up. Otherwise, the duplicate-volume name is extracted at random from among the duplicate-volume names registered in the table 108 in FIG. 6, or some other methods may be employed.

Next, it is judged whether or not a value is "off" which is stored in the field 606 of "available flags" in the volume configuration information table 108 (FIG. 6) in a manner of being made to correspond to the duplicate-volume name v extracted at S 1201 ("off" indicates that the duplicate volume is in a state of being unavailable) (S 1202). If the value stored in the field 606 of "available flags" is "on", the duplicate volume v has already been in a state of being available. Consequently, there is no need of performing processings hereinafter, and thus the processing is terminated (S 1206).

Meanwhile, if the judgment result at S 1202 has been found to be "YES", a value W is extracted which is stored in the field 608 of "groups" in the volume configuration information table 108 (FIG. 6) in a manner of being made to correspond to the duplicate-volume name v extracted at S 1201 (S 1203). Moreover, a value of the expiration time-limit is extracted which is stored in the field 303 of "expiration time-limits" in the backup-target management table 109 (FIG. 3) in a manner of being made to correspond to the extracted value W. Furthermore, consider a passage time which has elapsed, up to the present, from a point-in-time when the replication data stored in the duplicate volume v extracted at S 1201 had been backed up. Then, it is judged whether or not this passage time has exceeded the extracted expiration time-limit (S 1204). With respect to the management of the point-in-time when the replication data had been backed up, it is advisable just to store the point-in-time as follows: Namely, when storing the values of the replication data into the field 607 of "replication data" in the volume configuration information table 108 (FIG. 6), a field of "backup point-in-times" is provided in the same table so as to store the point-in-time at that time therein.

If, at the judgment at S 1204, the answer has been judged to be "NO", the processing is terminated (S 1206). Meanwhile, if, at S 1204, the answer has been judged to be "YES", "on" is written into the value stored in the field 606 of "available flags" in the volume configuration information table 108 (FIG. 6) in a manner of being made to correspond to the duplicate-volume name v extracted at S 1201 (S 1205). This resets the state of the duplicate volume v into a one of being selectable as a duplicate volume used for a backup that will be executed hereinafter.

With respect to a duplicate volume that stores therein replication data whose expiration time-interval has already elapsed during which the data should be saved, the above-described processings reset the state of the duplicate volume into the one of being available for another backup, i.e., the state where another replication data is newly storable. This allows the implementation of the effective utilization of the resource.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage medium for storing a program for allowing a computer to execute sequential procedures, said computer being connected to a storage apparatus for executing a backup by copying data from each original volume into each duplicate volume corresponding thereto upon receiving pair information, said pair information including each original-volume name and each duplicate-volume name corresponding thereto, said sequential procedures comprising sequential procedures of:

holding a first table that, for files as backup objects classified into plural groups each corresponding to a respective user business, stores each group name, file names, and each policy in a manner of being made to correspond to each other, said file names being included in said each group, said each policy being a method for managing replication data;

holding a second table for storing said file names, said group names, and flags in a manner of being made to correspond to said duplicate-volume names, said flags indicating whether or not said duplicate volumes are available;

when transmitting said pair information to said storage apparatus in response to a receipt of a specified first group name, said pair information including a first original-volume name and a first duplicate-volume name corresponding thereto, said first original-volume for storing therein a first file, storing said first file name and said specified first group name into said second table in a manner of being made to correspond to said first duplicate-volume;

when transmitting said pair information to said storage apparatus in response to a receipt of a specified second group name, said second group including said first file, said pair information including said first original-volume name and a second duplicate-volume name corresponding thereto, said first original-volume for storing therein the data of said first file, extracting said first duplicate-volume name out of said second table, and copying the first file into the first duplicate-volume;

extracting said first group name stored in said second table in a manner of being made to correspond to said extracted first duplicate-volume name;

judging whether or not said policy has a flag, said policy being stored in said first table in a manner of being made to correspond to said extracted first group name, said flag indicating that only data in the newest state is necessary for a file backed up in response to a receipt of the specified first group name; and, determining, depending on the judgment result, whether or not said flag should be stored into said second table, said flag indicating that said first duplicate volume is available.

2. A replication-data management method whereby, using a computer connected to a storage apparatus for executing a backup by copying data from each original volume into each duplicate volume corresponding thereto upon receiving pair information, said pair information including each original-volume name and each duplicate-volume name corresponding thereto, wherein replication data stored in said each duplicate volume is managed by said execution of said backup, said computer holding a first table and a second table, wherein files as backup objects are classified into plural groups, each corresponding to a respective user business, said first table is designed for storing file names in a manner of being made to correspond to each group name, said file names being included in said each group, and said second table is designed for storing said file names and said group names in a manner of being made to correspond to said duplicate-volume names, said replication-data management method comprising a step of:

when transmitting said pair information to said storage apparatus in response to the receipt of a specified first group name, said pair information including a first original-volume name and a first duplicate-volume name corresponding thereto, said first original-volume for storing therein a first file, storing said first file name and said specified first group name into said second table in a manner of being made to correspond to said first duplicate-volume name;

when transmitting said pair information to said storage apparatus in response to a receipt of a specified second group name, said second group including said first file, said pair information including said first original-volume name and a second duplicate-volume name corresponding thereto, said first original-volume for storing therein the data of said first file, extracting said first duplicate-volume name by making reference to said second table, and copying the first file into the first duplicate-volume;

extracting said firstgroup name stored in said second table in a manner of being made to correspond to said extracted first duplicate-volume name; and wherein said first table stores therein each policy, said each policy being a method for managing said replication data in a manner of being made to corresoond to said each group name, said computer holding a third table for storing flags in a manner of being made to correspond to said duplicate-volume names for storing said replication data, said flags indicating whether or not said duplicate volumes are available, and said replication-data management method further comprising the steps of:

judging whether or not said policy satisfies a predetermined condition, said policy being stored in said first table in a manner of being made to correspond to said extracted first group name; and, determining, depending on the judgment result, whether or not said flag should be stored into said third table, said flag indicating that said first duplicate volume is available.

3. The replication-data management method according to claim 2, wherein said step of judging whether or not said policy satisfies said predetermined condition is a step of judging whether or not said policy has a flag, said flag indicating that only data in the newest state is necessary for a file backed up with said group specified, said group being made to correspond to said policy.

4. The replication-data management method according to claim 2, wherein said each group includes files which are updated as a result of executing each business-operation for the user business corresponding thereto, said each business-operation being one collection of a series of processes.

5. The replication-data management method according to claim 4, wherein said first table stores therein each policy, said each policy being a method for managing said replication data in a manner of being made to correspond to said each group name, said computer holding a third table for storing flags in a manner of being made to correspond to said duplicate-volume names for storing said replication data, said flags indicating whether or not said duplicate volumes are available, said replication-data management method further comprising the steps of:

when transmitting said pair information to said storage apparatus in response to a receipt of a specified second group name, said second group including files which are updated as a result of executing a second business-operation for the user business corresponding to the second group, said pair information including said first original-volume name and a second duplicate-volume name corresponding thereto, said first original-volume for storing therein said first file which belongs to said second group, extracting said first duplicate-volume and said first group name, copying the first file into first duplicate-volume, said first group name being stored in said second table in a manner of being made to correspond to said first duplicate-volume name;

judging whether or not a file name is only said first file name, said file name being stored in said first table in a manner of being made to correspond to said extracted first group name;

judging whether or not said policy satisfies a predetermined condition, said policy being stored in said first table in a manner of being made to correspond to said extracted first group name; and, determining, depending on the judgment result, whether or not a flag should be stored into said third table, said flag indicating that said second duplicate volume is available.

6. A computer connected to a storage apparatus for executing a backup by copying data from each original volume into each duplicate volume corresponding thereto upon receiving pair information, said pair information including each original-volume name and each duplicate-volume name corresponding thereto, said computer comprising:

a memory unit for holding a first table and a second table, wherein files becoming backup targets are classified into plural groups each corresponding to a respective user business, said first table being designed for storing file names in a manner of being made to correspond to each group name, said file names being included in said each group, said second table being designed for storing said file names and said group names in a manner of being made to correspond to said duplicate-volume names; and a volume setting unit for executing a steps of:

when transmitting said pair information to said storage apparatus in response to a receipt of a specified first group name, said pair information including a first original-volume name and a first duplicate-volume name corresponding thereto, said first original-volume for storing therein a first file, storing said first file name and said first group name whose specification has been received into said second table in a manner of being made to correspond to said first duplicate-volume name;

when transmitting said pair information to said storage apparatus in response to a receipt of a specified second group name, said second group including said first file, said pair information including said first original-volume name and a second duplicate-volume name corresponding thereto, said first original-volume for storing therein the data of said first file, extracting said first duplicate-volume name by making reference to said second table, and copying the first file into the first duplicate-volume;

extracting said first group name stored in said second table in a manner of being made to correspond to said extracted first duplicate-volume name; and wherein said first table stores therein each policy, said each policy being a method for managing said replication data in a manner of being made to correspond to said each group name, said memory unit holding a third table for storing flags in a manner of being made to correspond to said duplicate-volume names for storing said replication data, said flags indicating whether or not said duplicate volumes are available, and said computer comprising said volume setting unit for further executing the steps of:

judging whether or not said policy satisfies a predetermined condition, said policy being stored in said first table in a manner of being made to correspond to said extracted first group name; and, determining, depending on the judgment result, whether or not said flag should be stored into said third table, said flag indicating that said first duplicate volume is available.

7. The computer according to claim 6, wherein said step of judging whether or not said policy satisfies said predetermined condition is a step of judging whether or not said policy has a flag, said flag indicating that only data in the newest state is necessary for a file backed up with said group specified, said group being made to correspond to said policy.

8. The computer according to claim 6, wherein said each group includes files which are updated as a result of executing each business-operation for the user business corresponding thereto, said each business-operation being one collection of a series of processes.

9. The computer according to claim 8, wherein said first table stores therein each policy, said each policy being a method for managing said replication data in a manner of being made to correspond to said each group name, said memory unit holding a third table for storing flags in a manner of being made to correspond to said duplicate-volume names for storing said replication data, said flags indicating whether or not said duplicate volumes are available, said volume setting unit being a volume setting unit for further executing the steps of:

when transmitting said pair information to said storage apparatus in response to a receipt of a specified second group name, said second group including files which are updated as a result of executing a second business-operation for the user business corresponding thereto, said pair information including said first original-volume name and a second duplicate-volume name corresponding thereto, said first original-volume for storing therein said first file which belongs to said second group, extracting said first duplicate-volume name and said first group name, and copying the first file into the first duplicate-volume, said first group name being stored in said second table in a manner of being made to correspond to said first duplicate-volume name;

judging whether or not a file name is only said first file name, said file name being stored in said first table in a manner of being made to correspond to said extracted first group name;

judging whether or not said policy satisfies a predetermined condition, said policy being stored in said first table in a manner of being made to correspond to said extracted first group name; and, determining, depending on the judgment result, whether or not a flag should be stored into said third table, said flag indicating that said second duplicate volume is available.

* * * * *